US007519223B2

(12) United States Patent
Dehlin et al.

(10) Patent No.: US 7,519,223 B2
(45) Date of Patent: Apr. 14, 2009

(54) RECOGNIZING GESTURES AND USING GESTURES FOR INTERACTING WITH SOFTWARE APPLICATIONS

(75) Inventors: Joel P. Dehlin, Redmond, WA (US); Christina Summer Chen, Redmond, WA (US); Andrew D. Wilson, Seattle, WA (US); Daniel C. Robbins, Seattle, WA (US); Eric J. Horvitz, Kirkland, WA (US); Kenneth P. Hinckley, Redmond, WA (US); Jacob O. Wobbrock, Pittsburgh, PA (US)

(73) Assignee: Microsoft Corporation, Redmond, WA (US)

( * ) Notice: Subject to any disclaimer, the term of this patent is extended or adjusted under 35 U.S.C. 154(b) by 837 days.

(21) Appl. No.: 10/880,167

(22) Filed: Jun. 28, 2004

(65) Prior Publication Data

US 2006/0010400 A1      Jan. 12, 2006

(51) Int. Cl.
*G06K 9/46* (2006.01)
*G06K 9/00* (2006.01)
(52) U.S. Cl. ............... 382/203; 382/103; 382/181; 345/173; 345/175; 348/77
(58) Field of Classification Search .......... 382/103, 382/181, 203; 345/173, 175; 348/77; 715/863
See application file for complete search history.

(56) References Cited

U.S. PATENT DOCUMENTS

| 4,992,650 | A | 2/1991 | Somerville ............... 235/462 |
| 5,319,214 | A | 6/1994 | Gregory |
| 5,436,639 | A | 7/1995 | Arai |
| 5,483,261 | A | 1/1996 | Yasutake ............... 345/173 |
| 5,526,177 | A | 6/1996 | Fantone |
| 5,528,263 | A | 6/1996 | Platzker |
| 5,821,930 | A | 10/1998 | Hansen |

(Continued)

FOREIGN PATENT DOCUMENTS

EP        0690407        1/1996

(Continued)

OTHER PUBLICATIONS

Office Action mailed Dec. 13, 2007 cited in related U.S. Appl. No. 10/834,675.

(Continued)

*Primary Examiner*—John B Strege
(74) *Attorney, Agent, or Firm*—Workman Nydegger

(57) ABSTRACT

An interactive display table has a display surface for displaying images and upon or adjacent to which various objects, including a user's hand(s) and finger(s) can be detected. A video camera within the interactive display table responds to infrared (IR) light reflected from the objects to detect any connected components. Connected component correspond to portions of the object(s) that are either in contact, or proximate the display surface. Using these connected components, the interactive display table senses and infers natural hand or finger positions, or movement of an object, to detect gestures. Specific gestures are used to execute applications, carryout functions in an application, create a virtual object, or do other interactions, each of which is associated with a different gesture. A gesture can be a static pose, or a more complex configuration, and/or movement made with one or both hands or other objects.

46 Claims, 16 Drawing Sheets

U.S. PATENT DOCUMENTS

| | | | |
|---|---|---|---|
| 5,831,601 | A | 11/1998 | Vogeley |
| 5,835,692 | A | 11/1998 | Cragun |
| 5,900,863 | A | 5/1999 | Numazaki |
| 5,920,688 | A | 7/1999 | Cooper |
| 5,940,076 | A | 8/1999 | Sommers |
| 5,973,315 | A | 10/1999 | Saldana |
| 6,128,003 | A | 10/2000 | Smith |
| 6,154,214 | A | 11/2000 | Uyehara |
| 6,266,061 | B1 | 7/2001 | Doi et al. ............... 345/358 |
| 6,340,119 | B2 | 1/2002 | He |
| 6,414,672 | B2 * | 7/2002 | Rekimoto et al. .......... 345/173 |
| 6,448,987 | B1 | 9/2002 | Easty |
| 6,469,722 | B1 | 10/2002 | Kinoe |
| 6,476,378 | B2 | 11/2002 | Nougaret |
| 6,520,648 | B2 | 2/2003 | Stark |
| 6,522,395 | B1 | 2/2003 | Barnji |
| 6,529,183 | B1 | 3/2003 | MacLean |
| 6,614,422 | B1 | 9/2003 | Rafii |
| 6,654,007 | B2 | 11/2003 | Ito |
| 6,690,363 | B2 | 2/2004 | Newton |
| 6,710,770 | B2 | 3/2004 | Tomasi |
| 6,720,949 | B1 | 4/2004 | Pryor |
| 6,750,877 | B2 | 6/2004 | Rosenberg |
| 6,781,069 | B2 | 8/2004 | Silverstein |
| 6,791,530 | B2 | 9/2004 | Vernier |
| 6,812,907 | B1 | 11/2004 | Gennetten |
| 6,840,627 | B2 | 1/2005 | Olbrich |
| 6,959,102 | B2 | 10/2005 | Peck |
| 7,075,687 | B2 | 7/2006 | Lippert |
| 7,084,859 | B1 | 8/2006 | Pryor |
| 7,120,280 | B2 | 10/2006 | Biswas |
| 7,161,578 | B1 | 1/2007 | Schneider |
| 7,268,774 | B2 | 9/2007 | Pittel |
| 7,310,085 | B2 | 12/2007 | Holloway |
| 2001/0012001 | A1 | 8/2001 | Rekimoto et al. .......... 345/173 |
| 2002/0006786 | A1 | 1/2002 | Mine |
| 2003/0161524 | A1 | 8/2003 | King |
| 2004/0005920 | A1 | 1/2004 | Soltys |
| 2004/0090524 | A1 | 5/2004 | Belliveau |
| 2004/0196371 | A1 | 10/2004 | Kono |
| 2005/0050476 | A1 | 3/2005 | SanGiovanni |
| 2005/0122308 | A1 | 6/2005 | Bell |
| 2005/0226467 | A1 | 10/2005 | Hatano |
| 2005/0226505 | A1 | 10/2005 | Wilson |
| 2005/0227217 | A1 | 10/2005 | Wilson |
| 2005/0245302 | A1 | 11/2005 | Bathiche |
| 2005/0277071 | A1 | 12/2005 | Yee |
| 2005/0281475 | A1 | 12/2005 | Wilson |
| 2006/0034492 | A1 | 2/2006 | Siegel |
| 2006/0056662 | A1 | 3/2006 | Thieme |
| 2006/0092170 | A1 | 5/2006 | Bathiche |
| 2006/0244719 | A1 | 11/2006 | Brigham |
| 2006/0289760 | A1 | 12/2006 | Bathiche |
| 2007/0063981 | A1 | 3/2007 | Galyjean |
| 2007/0126717 | A1 | 6/2007 | Cohen |
| 2007/0157095 | A1 | 7/2007 | Bilow |
| 2007/0279494 | A1 | 12/2007 | Aman |

FOREIGN PATENT DOCUMENTS

| | | |
|---|---|---|
| FR | 27656077 | 5/1998 |
| WO | WO 98/19292 | 5/1998 |

OTHER PUBLICATIONS

Office Action mailed Oct. 9, 2007 cited in related U.S. Appl. No. 10/867,434.

"3.6 Interpolation in Two or More Dimensions." Numerical Recipes in C: The Art of Scientific Computing. Chapter 3. Interpolation and Extrapolation. © 1988-1992, Cambridge University Press. Numerical Recipes Software. pp. 123-128.

"Bar Code 1, 2-Dimensional Bar Code Page." Available http://www.adams1.com/pub/russadam/stack.html. Printed Jan. 20, 2004. 14pp.

Ambiente article. "InteracTable®." Dated Jul. 7, 2000. Available http://www.darmstadt.gmd.de/ambiente/activities/interactable.html. Printed Nov. 21, 2003. 3pp.

Bier, Stone, Pier, Buston, and DeRose. "Toolglass and Magic Lenses: The See-Through Interface." *Proceedings of Siggraph '93* (Anaheim, August). Computer Graphics Annual Conference Series, ACM, 1993, pp. 73-80. 8pp.

Blickenstorfer, Conrad H. "First Look: Acer TravelMate TM100 with Windows XP Tablet PC Edition." Pen Computing Magazine. Jul. 2002. pp. 44-47.

"DiamondSpin—Begs for Direct Manipulation Technology Is it the Pen? Sony Leaps Out-of-the-Box Again with Gummi." Mitsubishi/DiamondSpin. CHI 2004 #3. Printed Apr. 30, 2004. 5pp.

Dietz and Leigh. "DiamondTouch: A Multi-User Touch Technology." *UIST '01* Orlando FLA. © ACM 2001 1-58113-438 -x/01/11. CHI Letters 3 (2). Nov. 11-14, 2001. pp. 219-226.

Electronic Check Alliance Processing, Inc. "Gift Cards, How Stored Value Card Systems Work." Available. http://www.electron-cap.com/GiftCards.htm. Printed Jan. 20, 2004 and May 16, 2004. © 2003. 2pp. total (3pp printed).

Fukuchi and Rekimoto. "Interaction Techniques for SmartSkin." *ACM UIST2002 demonstration*, 2002. 2pp.

Grabowski, Robert. "A Miniature Video Laser Range Finder for Small Robots." Available http://www.andrew.cmu.edu/~rjg/research/research_hardware/laser_rangefinder.html. Printed May 16, 2004. 8pp.

Grant and Winograd. "Flexible, Collaborative Organization on a Tabletop." *ACM CSCW 2002: Workshop on Co-located Tabletop Collaboration: Technologies and Directions*. New Orleans, LA. Nov. 2002. pp. 1-4.

Horn, Berthold K. P. "Robot Vision." The MIT Press. Available http://mitpress.mit.edu/catalog/item/default.asp?ttype=2 &tid=8388. Printed Dec. 17, 2003. 6pp. total.

Horn, Berthold Klaus Paul. "Robot Vision." Binary Images: Topological Properties. The MIT Electrical Engineering and Computer Science Series. 1986. pp. 66-71 and cover page(s).

Hunter, Andrew. "Connected Components Analysis (Computer Vision)." www.google.com search results http://www.google.com/search?sourceid=navclient&q=connected+component+ellipse. Printed Mar. 7, 2004. Article dated Sep. 24, 2002. 2pp search results, 21pp article.

"IR Distance Sensor." Available http://www.diyelectronics.com/Accessories/IRDS.html (2pp) and http://www.diyelectronics.com/Accessories/GP2D05.html (1pg). Printed Dec. 30, 2003. 3pp.

Ishii and Ullmer. "Tangible Bits: Towards Seamless Interfaces between People, Bits and Atoms." *Proceedings of CHI '97*, Mar. 22-27, 1997, Atlanta, Georgia. © 1997 ACM 0-89791-802-9/97/03. pp. 1-8.

Ishii, Wisneski, Orbanes, Chun, and Paradiso. "PingPongPlus: Design of an Athletic-Tangible Interface for Computer-Supported Cooperative Play." *Proceeding of CHI '99*, May 15-20, 1999, © 1999 ACM. pp. 1-8.

Johanson, Kolodny, and Russell. "A Hand pose and Position Tracker for the Interactive Table." CS223B Final Project. Available http://graphics.stanford.edu/~drussel/vision/tracker-report.html. Printed Dec. 16, 2003, 6pp.

Ju, Hurwitz, Judd, and Lee. "CounterActive: An Interactive Cookbook for the Kitchen Counter." *Extended Abstracts of CHI 2001*, Seattle. Apr. 2001. pp. 269-270.

Kang, Sing Bing. "Radial Distortion Snakes." *IAPR Workshop on Machine Vision Applications (MVA2000)*, Tokyo, Japan. Nov. 2000. pp. 603-606.

Kato, Billinghurst, Poupyrev, Imamoto, and Tachibana. "Virtual Object Manipulation on a Table-Top AR Environment." *IEEE and ACM Int'l Symposium on Augmented Reality 2000, ISAR '2000*, Oct. 5-6, 2000, Munich. 9pp.

Klemmer, Newman, and Sapien. "The Designer's Outpost: A Task-Centered Tangible Interface for Web Site Information Design." *Proceedings of Human Factors in Computing Systems: CHI 2000 Extended Abstracts*. The Hague, The Netherlands. Apr. 1-6, 2000. pp. 333-334.

Klemmer, Newman, Farrell, Bilezikjian, and Landay. "The Designers' Outpost: A Tangible Interface for Collaborative Web Site Design." *CHI Letters, The 14th Annual ACM Symposium on User Interface Soft Technology: UIST 2001.* 3(2). pp. 1-10.

Kobayashi, Hirano, Narita, and Ishii. "A Tangible Interface for IP Network Simulation." *CHI 2003*, Apr. 5-10, 2003, Ft. Lauderdale, FL ACM 1-58113-630-7/03/0004. 2pp.

Koike, Sato, and Kobayashi. "Integrating Paper and Digital Information on EnhancedDesk: A Method for Realtime Finger Tracking on an Augmented Desk System." *ACM Transaction on Computer-Human Interaction*, vol. 8 No. 4, Dec. 2001. © 2001 ACM 1073-0516/01/1200-0307. pp. 307-322.

Leibe, Starner, Ribarsky, Wartell, Krum, Singletary, and Hodges. "The Perceptive workbench: Toward Spontaneous and Natural Interaction In Semi-Immersive Virtual Environments." *Proceedings of the IEEE Virtual Reality 2000 Conference*, Mar. 18-22, 2000. New Brunswick, New Jersey: IEEE Computer Society, 2000. 8pp.

Leigh and Dietz. "DiamondTouch Characteristics and Capabilities." Mitsubishi Electric Research Laboratories, Cambridge, Massachusetts, USA. Undated. 2pp.

Magerkurth, Stenzel, and Prante. "Stars—A Ubiquitous Computing Platform for Computer Augmented Tabletop Games." *5th International Conference on Ubiquitous Computing (Ubicomp '03)*, Oct. 12-15, 2003, Seattle, Washington. 2pp.

Malandain, Grégoire. "Connected Components Extraction." Available http://www-sop.inria.fr/epidaure/personnel/malandain/segment/connexe.html. Printed Dec. 18, 2003. 3pp.

Matsushita and Rekimoto. "HoloWall: Designing a Finger, Hand, Body, and Object Sensitive Wall." *UIST '97* Banff, Alberta, Canada. © 1997 ACM 0-89791-881-9/97/10. pp. 209-210.

Missouri Department Of Revenue. "2D Barcode Technology." Undated. 3pp.

Moran, Saund, van Melle, Gujar, Fishkin, and Harrison. "Design and Technology for Collaborage; Collaborative Collages of Information on Physical Walls." *UIST '99*. Asheville, NC. © 1999 ACM 1-58113-075-9/99/11, CHI Letters vol. 1, 1. pp. 197-206.

Pangaro, Maynes-Aminzade, and Ishii. "The Actuated Workbench: Computer-Controlled Actuation in Tabletop Tangible Interfaces." *Proceedings of UIST 2002*, Oct. 27-30, 2002. © 2002 ACM. 10pp.

Paradiso, Hsiao, Strickon, Lifton, and Adler. "Sensor systems for interactive surfaces." *IBM Systems Journal*, vol. 39, Nos. 3&4, 2000. pp. 892-914.

Patten, Ishii, Hines, and Pangaro. "Sensetable: A Wireless Object Tracking Platform for Tangible User Interfaces." *Proceedings of CHI 2001*, Mar. 31-Apr. 5, 2001, ACM Press, © 2001 ACM. 8pp.

Patten, Recht, and Ishii. "Audiopad: A Tag-based Interface for Musical Performance." *Proceedings of Conference on New Interface for Musical Expression (NIME '02)*. Dublin, Ireland, May 24-26, 2002. 6pp.

Ramos and Balakrishnan. "Fluid Interaction Techniques for the Control and Annotation of Digital Video." *UIST '03* Vancouver, B.C., Canada. © 2003 ACM 1-58113-636-06/03/0010. pp. 105-114.

Rekimoto and Ayatsuka. "CyberCode: Designing Augmented Reality Environments with Visual Tags." *Proc. of UIST 2000*, 2000. 10pp.

Rekimoto and Matsushita. "Perceptual Surfaces: Towards a Human and Object Sensitive Interactive Display." *Proceedings of Workshop on Percepturaí User Interactes (PUI'97)*, 1997. 3pp.

Rekimoto and Nagao. "The World through the Computer: Computer Augmented Interaction with Real World Environments." *Proceedings of UIST'95*, 1995. pp. 29-36.

Rekimoto and Saitoh. "Augmented Surfaces: A Spatially Continuous Work Space for Hybrid Computing Environments." *CHI '99*, May 15-20, 1999. Pittsburgh, Pennsylvania. © ACM 1999 0-201-48559-1/99/05. pp. 378-385.

Rekimoto, Jun. "Matrix: A Realtime Object Identification and Registration Method for Augmented Reality." *Proc. of Asia Pacific Computer Human Interaction (APCHI '98)*, 1998. 6pp.

Rekimoto, Jun. "Multiple-Computer User Interfaces: 'Beyond the Desktop' Direct Manipulation Environments." *ACI CHI2000 Video Proceedings*, 2000. 2pp.

Rekimoto, Jun. "Pick-and-Drop: A Direct Manipulation Technique for Multiple Computer Environments." *Proceedings of UIST'97*, 1997. pp. 31-39.

Rekimoto, Jun. "SmartSkin: An Infrastructure for Freehand Manipulation on Interactive Surfaces." *CHI 2002*, Apr. 20-25, 2002, Minneapolis, Minnesota. © ACM 1-58113-453-3/02/0004. 8pp.

Rekimoto, Ullmer, and Oba. "DataTiles: A Modular Platform for Mixed Physical and Graphical Interactions." *SIGCHI'01*, Mar. 31-Apr. 4, 2001, Seattle, WA. © 2001 ACM 1-58113-327-8/01/0003. 8pp.

Reznik, Canny, and Alldrin. "Leaving on a Plane Jet." *2001 Int. Conf. on Intell. Robots & Systems (IROS)*, Maui, Hawaii, Oct. 2001. 6pp.

Ringel, Gerh, Jin, and Winograd. "Barehands: Implement-Free Interaction with a Wall-Mounted Display." Short Talks. *CHI 2001* Mar. 31-Apr. 5. pp. 367-368.

Rosenfeld, Zawadzki, Sudol, and Perlin. "Planar Manipulator Display." New York University mrl. NYU Media Research Lab. Available http://cat.nyu.edu/PMD. Printed May 16, 2004. 3pp.

Rovani, David (Posted by). "My Second Month with the Compaq Tablet." *Home>Reviews, TablePCHome.com—Table PC user community*. Posted Apr. 10, 2003. Available http://www.tabletpchome.com/Messages.aspx?ThreadID=140. Printed Dec. 30, 2003. pp. 1-2 of 5.

Schmalstieg, Encarnação, and Szalavári. "Using Transparent Props for Interaction With The Virtual Table." Presented at *1999 ACM Symposium on Interactive 3D Graphics (I3DG '99)*. Apr. 26-28, 1999, Atlanta, GA. 7pp.

Scott, Grant and Mandryk. "System Guidelines for Co-located collaborative Work on a Tabletop Display." *Proceedings of ECSCW'03, European Conference Computer-Supported Cooperative Work 2003*, Helsinki, Finland, Sep. 14-18, 2003. 20pp.

Shen, Everitt, and Ryall. "UbiTable: Impromptu Face-to-Face Collaboration on Horizontal Interactive Surfaces." © Mitsubishi Electric Research Laboratories, Inc., 2003. Cambridge, Massachusetts. TR-2003-49. Sep. 2003. 10pp.

Shen, Lesh, and Vernier. "Personal Digital Historian: Story Sharing Around the Table." *Interactions*. Mar.+Apr. 2003. pp. 15-22.

Shen, Lesh, Bernier, Forlines, and Frost. "Sharing and Building Digital Group Histories." *CSCW'02*, Nov. 16-20, 2002, New Orleans, Louisiana. © ACM 1-58113-560-2/02/0011. 10pp.

Shen, Lesh, Moghaddam, Beardsley, and Bardsley. "Personal Digital Historian: User Interface Design." © Mitsubishi Electric Research Laboratories, Inc. 2001. Cambridge, Massachusetts. 5pp.

Shen, Vernier, Forline, and Ringel. "DiamondSpin: An Extensible Toolkit for Around-the-Table Interaction." *CHI 2004*, Apr. 24-29, 2004, Vienna, Austria. © 2004 ACM 1-58113-702-8/04/0004. 8pp.

Smart Technologies Inc. White Paper. "DViT Digital Vision Touch Technology." Feb. 2003. 10pp.

Smart Technologies, Inc. "Rear Projection Smart Board™ Interactive Whiteboard" "Smart Board Software". Available http://www.smarttech.com/Products/rearprojection/index.asp and http://www.smarttech.com/Products/sbsoftware/index.asp. Printed Dec. 16, 2003. 5pp. total.

Starner, Leibe, Singletary, Lyons, Gandy, and Pair. "Towards Augmented Reality Gaming." Available http://www.gvu.gatech.edu/ccg/publications/imagina2000/. Printed Dec. 30, 2003. 27pp.

Streitz, Geißler, Holmer, Konomi, Müller-Tomfelde, Reischl, Rexrogh, Seitz, and Steinmetz. "i-LAND: An interactive Landscape for Creativity and Innovation." *Proceedings of the ACM Conference on Human Factors in Computing Systems (CHI'99)*, Pittsburgh, Pennsylvania, May 15-20, 1999. ACM Press, New York. pp. 120-127.

Symanizk, Jürgen. "Three-Dimensional Statistical Graphics Based On Interactively Animated Anaglyphs." Published 1993. Available http://citeseer.mj.nec.com/95667.html. Printed Feb. 25, 2004. 7pp. total.

"The Tablet PC A detailed look at Microsoft's proposed Tablet PC." *Pen Computing Magazine: Tablet PC*. Available http://www.pencomputing.com/frames/textblock_tablet_pc.html. Printed Dec. 30, 2003. pp. 1.

Tandler, Prante, Müller-Tomfelde, Streitz, and Steinmetz. "ConnecTables: Dynamic Coupling of Displays for the Flexible Creation of Shared Workspaces." *Proceedings of the 14. Annual ACM Symposium on User Interface Software and Technoic (USIT'01)*, ACM Press (CHI Letters 3 (2)), 2001, pp. 11-20 (10pp).

Ullmer and Ishii. "The metaDesk: Models and Prototypes for Tangible User Interfaces." *Proceedings of UIST'97*, Oct. 14-17, 1997. © 1997 ACM—ACM 0-89791-881-9/97/10. 10pp.

Ullmer, Ishii, and Glas. "mediaBlocks: Physical Containers, Transports, and Controls for Online Media." *Computer Graphics Proceedings (SIGGRAPH'98)*, Jul. 19-24, 1998, © 1998 ACM. ACM-0-89791-999-8/98/007. 8pp.

Ullmer, Ishii, and Jacob. "Tangible query Interfaces: Physically Constrained Tokens for Manipulating Database Queries." *Proc. INTERACT 2003 Conference*, 2003. 11pp.

Underkoffler and Ishii. "Illuminating Light: An Optical Design Tool with a Luminous-Tangible Interface." *Proceeding of CHI '98*, Apr. 18-23, 1998, © 1998 ACM. pp. 1-8.

Underkoffler and Ishii. "Urp: A Luminous-Tangible Workbench for Urban Planning and Design." *Proceedings of CHI '99*. May 15-20, 1999. © 1998 ACM. pp. 1-8.

Underkoffler, Ullmer, and Ishii. "Emancipated Pixels: Real-World Graphics in the Luminous Room." *Proceedings of SIGGRAPH '99*, Aug. 8-13, 1999, © 1999 ACM. 8pp.

Vernier, Lesh, and Shen. "Visualization Techniques for Circular Tabletop Interfaces." To appear in *Advanced Visual Interfaces*, May 2002, Trento, Italy. © 2002 Mitsubishi Electric Research Laboratories, Inc. MERL-TR2002-01. Authored Mar. 2002. 10pp.

Viola and Jones. "Robust Real-time Object Detection." Cambridge Research Laboratory, Technical Report Series. Compaq. CRL 2001/01, Feb. 2001. 30pp.

"VirtualBoard." Available http://visilab.unime.it/visilab/virtualboard.htm. Printed Dec. 16, 2003. 6pp.

Von Hardenberg and Bérard. Bare-Hand Human-Computer Interaction. *PUI 2001* Orlando, FL, © 2001 ACM 1-58113-448-7-11/14/01. 8pp.

Wellner, Pierre. "Interacting with Paper on the DigitalDesk." *Communications of the ACM*. Jul. 1993. EuroPARC tech report EPC-93-195. 17pp.

Whalen, Tara. "Playing well with Others: Applying Board Game Design to Tabletop Display Interfaces." *UIST 2003*. Vancouver, Nov. 2-5, 2003, 3pp.

Wu and Balakrishnan. "Multi-Finger and Whole Hand Gestural Interaction Techniques for Multi-User Tabletop Displays." *UIST '03*, Vancouver, B.C., Canada. © 2003 ACM 1-58113-636-6/03/0010. pp. 193-202.

Office Action mailed Jun. 29, 2007 cited in related U.S. Appl. No. 10/834,675.

Office Action mailed Aug. 30, 2007 cited in related U.S. Appl. No. 10/870,777.

Kijma, Ryugo, et al. "Distributed Display Approach Using PHMD with Infrared Camera", Proceedings of the IEEE Virtual Rality, Orlando, Florida, Mar. 24-28, 2002. pp. 1-8.

Pavlidis, Ioannis, et al. "A Vehicle Occupant Counting System Based on Near-Infrared Phenomenology and Fuzzy Neural Classification", IEEE Transactions on Intelligent Transportation Systtem, New York, NY, vol. 1, No. 2., Jun. 2000, pp. 78-80.

Hardenberg Von. Christian, "Fingertracking and Handposture Recognition for Real-Time Human-Computer Interaction", Berlin, Jul. 20, 2001.

Notice of Allowance mailed Mar. 28, 2008 cited in related U.S. Appl. No. 10/834,675.

Notice of Allowance mailed Feb. 27, 2008 cited in related U.S. Appl. No. 10/814,761.

"The Tracking Cube: A Three Dimensional Input Device" IBM Techincal Disclosure Bulletin, IBM Corp. New York, US, vol. 32, No. 3B; Aug. 1, 1989, pp. 91-95.

Northop Grumman "TouchTable™" Brochure © 2005 Northop Grumman Space & Mission Systems Corp. RS1190705. 2pp.

Department of Defence, Department of Defence Logistics Automatic Indentification Technology Handbook for Product and Shipping Label Quality Assurance, Feb. 15, 2000, p. 14, Section 3.3.3.6, http://www.dodait.com/conf/data1199/printquality/print0111r6.doc.

Notice of Allowance dated Apr. 23, 2008 cited in related U.S. Appl. No. 10/969,746.

Office Action dated Jun. 12, 2008 cited in related U.S. Appl. No. 11/117,979.

Office Action dated Oct. 9, 2007 cited in related U.S. Appl. No. 10/813,855.

Office Action dated May 7, 2008 cited in related U.S. Appl. No. 10/813,855.

Related U.S. Appl. No. 12/106,910, filed Apr. 21, 2008.

Related U.S. Appl. No. 12/110,032, filed Apr. 25, 2008.

Office Action dated Jun. 26, 2008 cited in related U.S. Appl. No. 11/364,319.

Office Action dated Jul. 10, 2008 cited in U.S. Appl. No. 10/867,434.

Office Action dated Feb. 8, 2008 cited in U.S. Appl. No. 11/321,551.

Office Action dated Aug. 19, 2008 cited in U.S. Appl. No. 11/321,551.

Notice of Allowance dated Oct. 16, 2007 cited in U.S. Appl. No. 10/814,761.

Office Action dated Aug. 29, 2008 cited in U.S. Appl. No. 10/870,777.

Strickson, Joshua and Paradiso, Joseph; "Tracking Hands Above Large Interactive Surfaces with Low-Cost Scanning Laser Rangefinder" ACM CHI. 98 Conference, Apr. 21-23, 1998, Los Angeles, CA.; pp. 1-2.

Lensch, Hendrick P.A.; Goesele, Michael; Jan Kautz; Hans-Peter Seidel; "A Framework for the Acquisition, processing, Transmission, and Interactive Display of High Quality 3D Models on the Web" Research Report, Max-Planck-Institute, May 2001; Sections 5 and 8.

Notice of Allowance dated Oct. 8, 2008 cited in U.S. Appl. No. 10/880,167.

Notice of Allowance Dated Oct. 17, 2008 cited in U.S. Appl. No. 10/969,746.

Office Action dated Oct. 7, 2008 cited in U.S. Appl. No. 11/218,171.

Office Action dated Oct. 30, 2008 cited in U.S. Appl. No. 12/106,910.

Office Action dated Sep. 2, 2008 cited in U.S. Appl. No. 11/170,234.

Notice of Allowance dated Sep. 11, 2008 cited in U.S. Appl. No. 11/117,979.

* cited by examiner

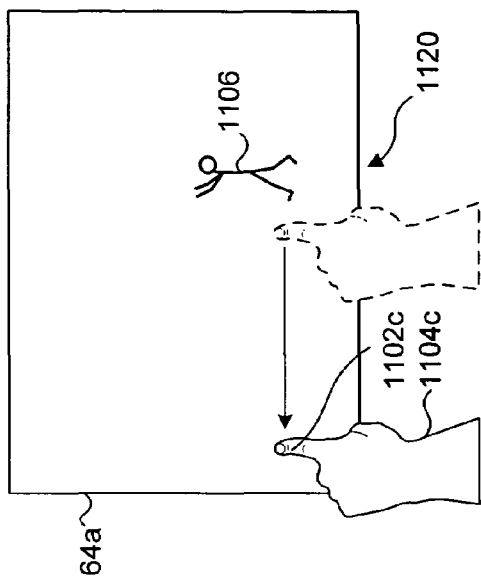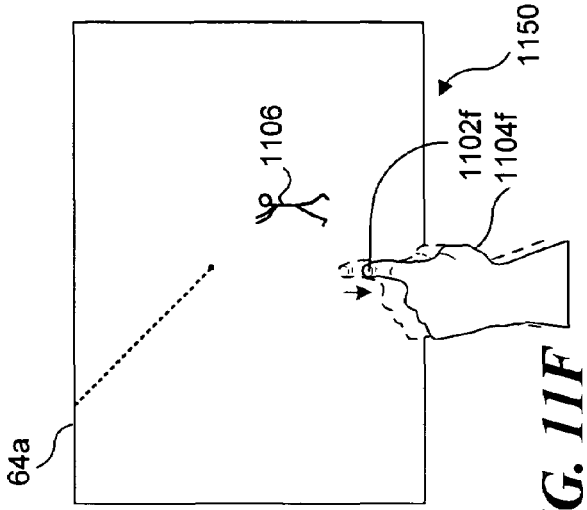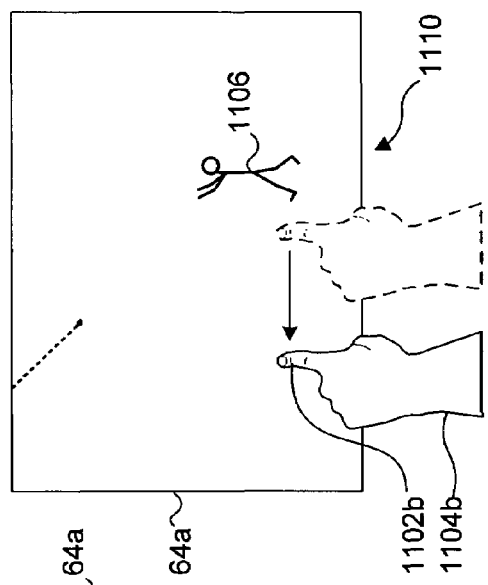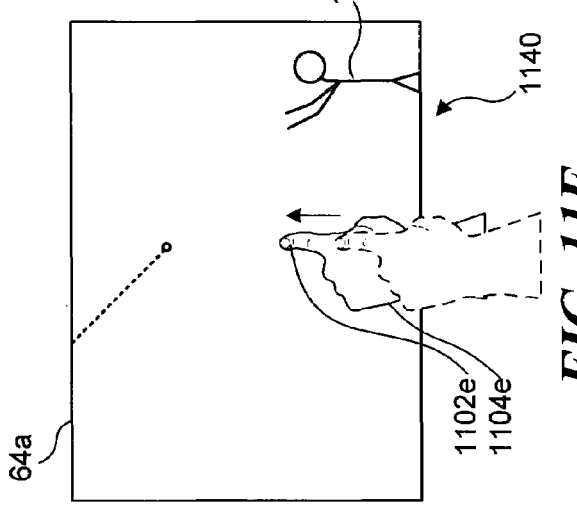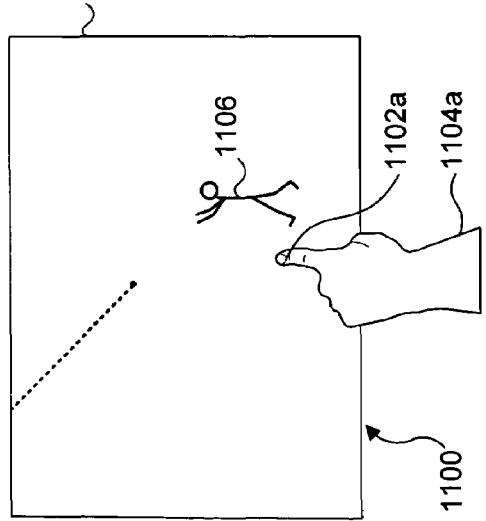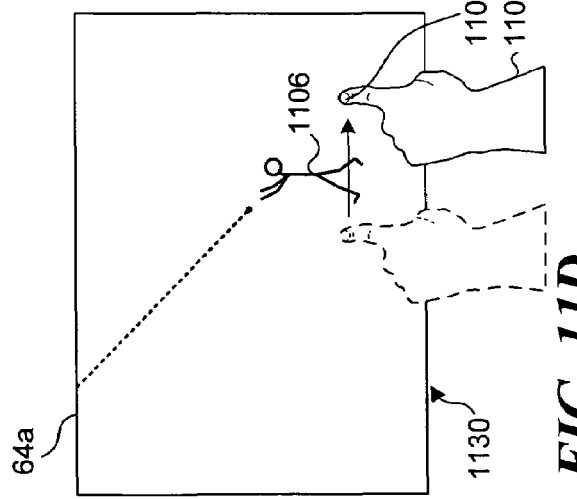

RECOGNIZING GESTURES AND USING GESTURES FOR INTERACTING WITH SOFTWARE APPLICATIONS

FIELD OF THE INVENTION

This invention generally pertains to a method and apparatus for detecting gestures made with a user's hands and fingers to interact with a virtual environment displayed on an interactive display surface, and more specifically, pertains to controlling software applications or the display of images on the display surface using natural hand or finger motions proximate to the display surface.

BACKGROUND OF THE INVENTION

The interaction between computing devices and users continues to improve as computing platforms become more powerful and able to respond to a user in many new and different ways, so that a user is not required to type on a keyboard in order to control applications and input data. The development of a graphic user interface system, like that provided by Microsoft Corporation's WINDOWS™ operating system, has greatly improved the ease with which a user can interact with a computing device, by enabling a user to input control actions and make selections in a more natural and intuitive manner.

The ease with which a user can input control actions is particularly important in electronic games and other virtual environments, because of the need to provide input quickly and efficiently. Users typically interact with virtual environments by manipulating a mouse, joystick, wheel, game pad, track ball, or other user input device to carry out some function as defined by the software program that produces the virtual environment. The virtual environment and the effects of the user interaction with objects in the virtual environment are generally visible on a display, so that the user has immediate feedback regarding the results of the user's input and control actions.

Another form of user input employs displays that are responsive to the touch of a user's finger or a stylus. Touch responsive displays can be pressure activated, respond to electrical capacitance or changes in magnetic field intensity, employ surface acoustic waves, or respond to other conditions that indicate the location of a finger or stylus on the display. Another type of touch sensitive display includes a plurality of optical sensors that are spaced apart around the periphery of the display screen so that the location of a finger or stylus touching the screen can be detected. Using one of these touch sensitive displays, a user can more directly control a virtual object that is being displayed. For example, the user may touch the displayed virtual object with a finger to select the virtual object and then drag the selected virtual object to a new position on the touch-sensitive display.

Capacitive, electromagnetic, optical, or other types of sensors used in conventional touch-sensitive displays typically cannot simultaneously detect the location of more than one finger or object touching the display screen at a time. Capacitive or resistive, or acoustic surface wave sensing display surfaces that can detect multiple points of contact are unable to image objects on a display surface with any degree of resolution. Prior art systems of these types cannot detect patterns on an object or detailed shapes that might be used to identify each object among a plurality of different objects that are placed on a display surface.

Another approach that has been developed in the prior art uses cameras mounted to the side and above a horizontal display screen to visually capture an image of a user's finger or other objects that are touching the display screen. This multiple camera mounting configuration is clearly not a compact system that most people would want to use in a residential setting. In addition, the accuracy of this type of multi-camera system in responding to an object that is on or proximate to the display surface depends upon the capability of the software used with the system to visually recognize objects and their location in three-dimensional space. Furthermore, the view of one object by one of the cameras may be blocked by an intervening object.

To address many of the problems inherent in the types of touch-sensitive and other displays discussed above, a user interface platform was developed in the MIT Media Lab, as reported by Brygg Ullmer and Hiroshi Ishii in "The metaDESK: Models and Prototypes for Tangible User Interfaces," Proceedings of UIST 10/1997:14-17. The metaDESK includes a near-horizontal graphical surface used to display two-dimensional geographical information. An arm-mounted, flat-panel display disposed above the graphical surface serves as an "active lens" for use in displaying three-dimensional geographical information. A computer vision system inside the desk unit (i.e., below the graphical surface) includes infrared (IR) lamps, an IR camera, a video camera, a video projector, and mirrors. The mirrors reflect the graphical image projected by the projector onto the underside of the graphical display surface. The IR camera can detect a distinctive pattern provided on the undersurface of passive objects called "phicons" that are placed on the graphical surface. Magnetic-field position sensors and electrical-contact sensors are also included in the metaDESK. For example, in response to the IR camera detecting the IR pattern (which is transparent to visible light) applied to the bottom of a "Great Dome phicon," a map of the MIT campus is displayed on the graphical surface, with the actual location of the Great Dome in the map positioned where the Great Dome phicon is located. Moving the Great Dome phicon over the graphical surface manipulates the displayed map by rotating or translating the map in correspondence to the movement of the phicon by a user.

A similar approach to sensing objects on a display surface is disclosed in several papers published by Jun Rekimoto of Sony Computer Science Laboratory, Inc. in collaboration with others. These papers briefly describe a "HoloWall" and a "HoloTable," both of which use IR light to detect objects that are proximate to or in contact with a display surface on which a rear-projected image is visible. The rear-projection panel, which is vertical in the HoloWall and horizontal in the HoloTable, is semi-opaque and diffusive, so that objects become more clearly visible as they approach and then contact the panel. The objects thus detected can be a user's fingers, hands, or other types of objects.

By using an interactive display that can optically detect an object on or near the display surface, it should be possible to detect movement of the object in a specific manner. Accordingly, it would be desirable for an interactive display surface to respond to specific gestures made with the user's hand that are detected by the interactive display surface. Mike Wu and Ravin Balakrishnan of the University of Toronto Department of Computer Science have pointed out the advantages of using predefined gestures for interacting with an application ("Multi-Finger and Whole Hand Gestural Interaction Techniques for Multi-User Tabletop Displays," UIST '03) USING A Mitsubishi DiamondTouch table that employs capacitive coupling to sense hand and finger positions as the user makes a gesture. Gonzalo Ramos and Ravin Balakrishnan (also from the University of Toronto Department of Computer Science)

demonstrated controlling video using gestures ("Fluid Interaction Techniques for Control and Annotation of Digital Vide," UIST '03) on a pressure-sensitive TabletPC (or, as they noted, a higher-end workstation equipped with a digitizer tablet). In each of these prior art systems, the system must learn the functions that are activated by the gestures. However, these two prior art systems suffer with the same limitations as other touch sensitive, capacitive, or electromagnetic sensitive display surfaces—i.e., the lack of good imaging resolution, the inability to properly distinguish shape and orientation of objects, and the difficulty in sensing multiple objects in contact with the display surface at one time. Also, a pressure sensitive display surface requires actual contact with the display surface and cannot respond to objects that are in proximity with the display surface.

What is clearly needed is an interactive display system that is capable of controlling interactions with applications and selecting functions or objects using natural gestures that are intuitive in their relationship to the functions they cause to occur. It should be possible to use one or more fingers on one or more hands in making the gestures, if desired, and not require that the user's appendage(s) be in actual contact with the display surface.

SUMMARY OF THE INVENTION

Accordingly, one aspect of the present invention is directed to a method for using a gesture in connection with an interactive display system on which images are displayed and objects disposed on or proximate thereto are optically detectable. In this method, an image is formed with light reflected from an object grasped by a user's hand, or at least a portion of an appendage of a user's body that is disposed above a display surface of the interactive display system. The light that is thus reflected is detected after passing through the display surface. The appendage can include an arm, a hand, and/or one or more digits (i.e., a thumb or finger) of the hand, any portion of which may be simply proximate to the display surface or in actual contact therewith. The image is processed to detect at least one connected component within the image. A connected component is defined as a portion of the image comprising adjacent pixels having an intensity above a predefined threshold. Based upon the one or more connected components in the image, a gesture is recognized that was made with the object or the portion of the appendage of the user's body relative to the display surface. As a function of the gesture that was recognized, the method automatically produces a response that has previously been associated with the gesture. This response changes a state of the interactive display system in a defined manner, as will be evident from the following discussion.

The gesture can be made in several different ways. For example, a gesture can include a movement of an object along a generally defined path, or can comprise a pose of at least the portion of the appendage of the user adjacent to the display surface.

At least one connected component may include at least one touch connected component corresponding to a contact of the display surface by the object. Also, at least one connected component may correspond to either a finger or a hand of the user.

The response that is automatically produced can comprise the step of executing a software application associated with the gesture, on the interactive display system. Optionally, the gesture can define an alpha character that relates to the software application. For example, the gesture can be formed in the shape of the first letter of the application name.

When an application is being executed by the interactive display system, the response that is automatically produced can comprise the step of executing a function within that application. Furthermore, the response can enable the user to move an object to indicate an extent by which a variable relating to the function is changed when the function is executed.

In another embodiment, the response that is automatically produced comprises the step of selecting a region defined by the gesture on the display surface of the interactive display system. The gesture can also be employed for selecting either an image or a virtual object that is presented on the display surface. In this case, the response can further comprise the step of enabling the user to resize the image or the virtual object by moving at least one part of the appendage of the user over the display surface.

In yet another embodiment, the gesture is used to cause a response wherein a virtual object associated with the gestured is presented on the display surface. In this embodiment, for example, the user might employ a natural gesture that is generally shaped like the virtual object.

Detecting at least one connected component can include the step of detecting a plurality of touch connected components and at least one hover connected component to generally determine an orientation of the appendage of the user. The orientation of the appendage can then enable the gesture to be correctly recognized. The plurality of touch connected components will typically correspond to fingers of the user that are in contact with the display surface, and any hover connected component will typically correspond to a hand of the user that is proximate the display surface, but not actually touching it.

Another aspect of the present invention is directed to a memory medium storing machine instructions for carrying out the steps of the method that are done by a computing device.

A further aspect of this invention is directed to an interactive display system that responds to a gesture made with object, for example, an appendage of a user's body or an object grasped in a hand of a user. The interactive display system includes a display surface having an interactive side on or adjacent to the object can be placed and manipulated, and an opposite side. A light source directs light toward the opposite side of the display surface and through the display surface, to the interactive side, illuminating objects such as the appendage of the user that is proximate to the interactive side. A light sensor is disposed to receive and sense light reflected back from the object through the display surface, producing a signal corresponding to an image of the object that is in contact or proximate the display surface. A processor is in communication with the light sensor and a memory. The memory stores data and machine instructions that cause the processor to carry out a plurality of functions. These functions are generally consistent with the steps of the method described above.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

Figure 6A:
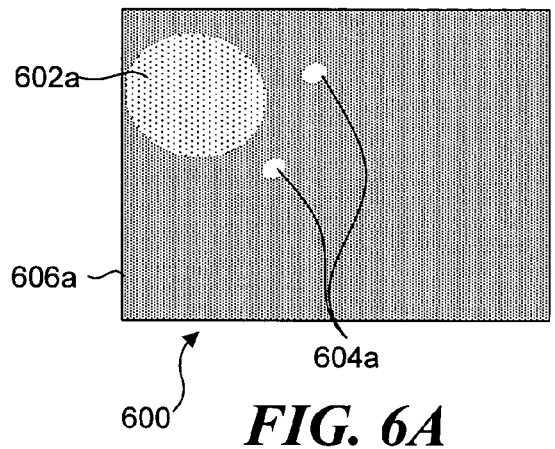
Figure 6B:
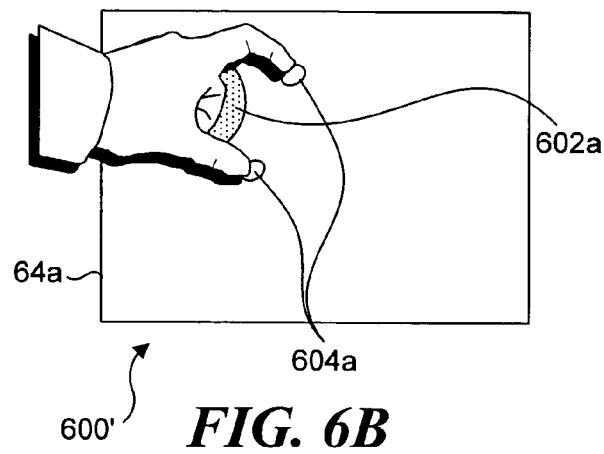
Figure 6C:
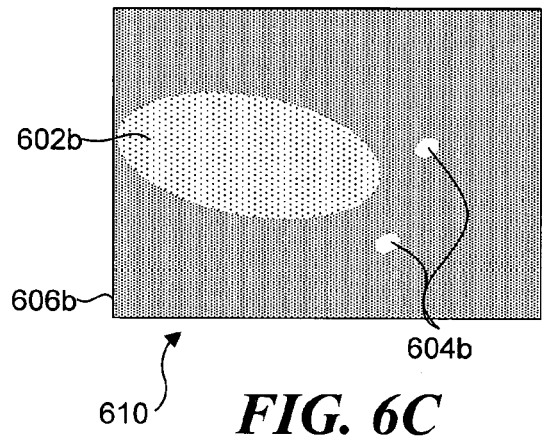
Figure 6D:
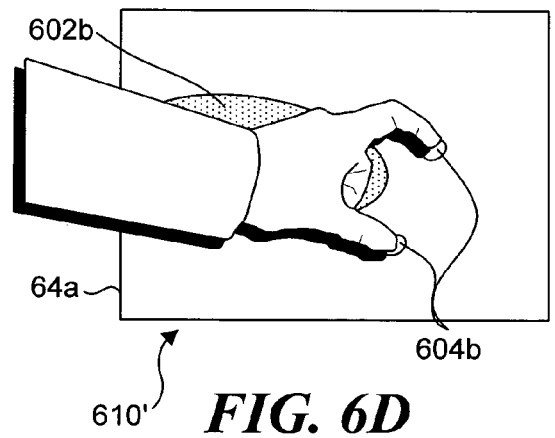
Figure 6E:
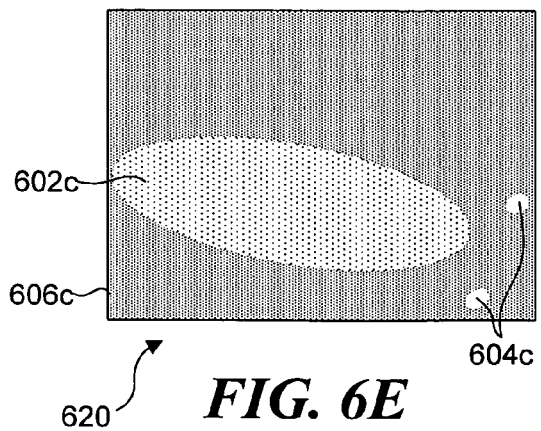
Figure 6F:
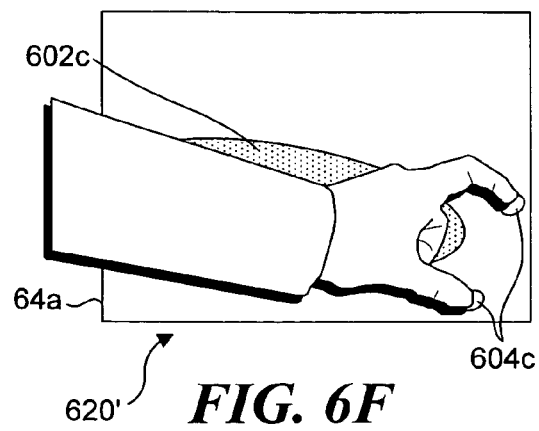
Figure 7A:
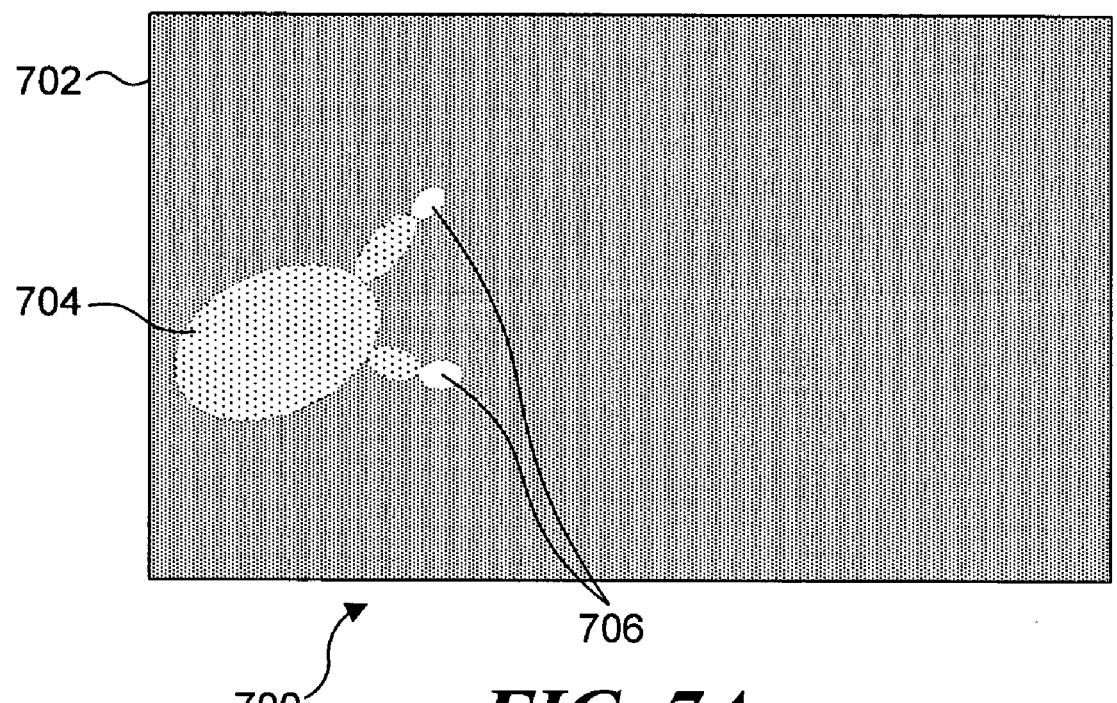
Figure 7B:
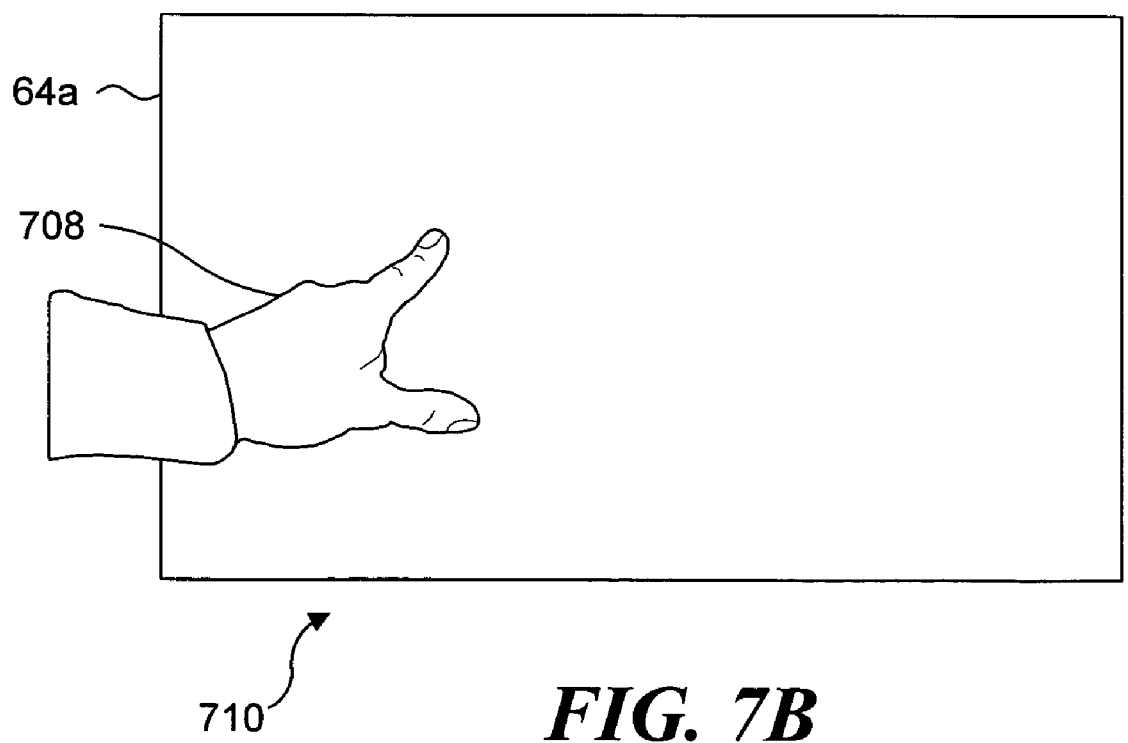
Figure 8A:
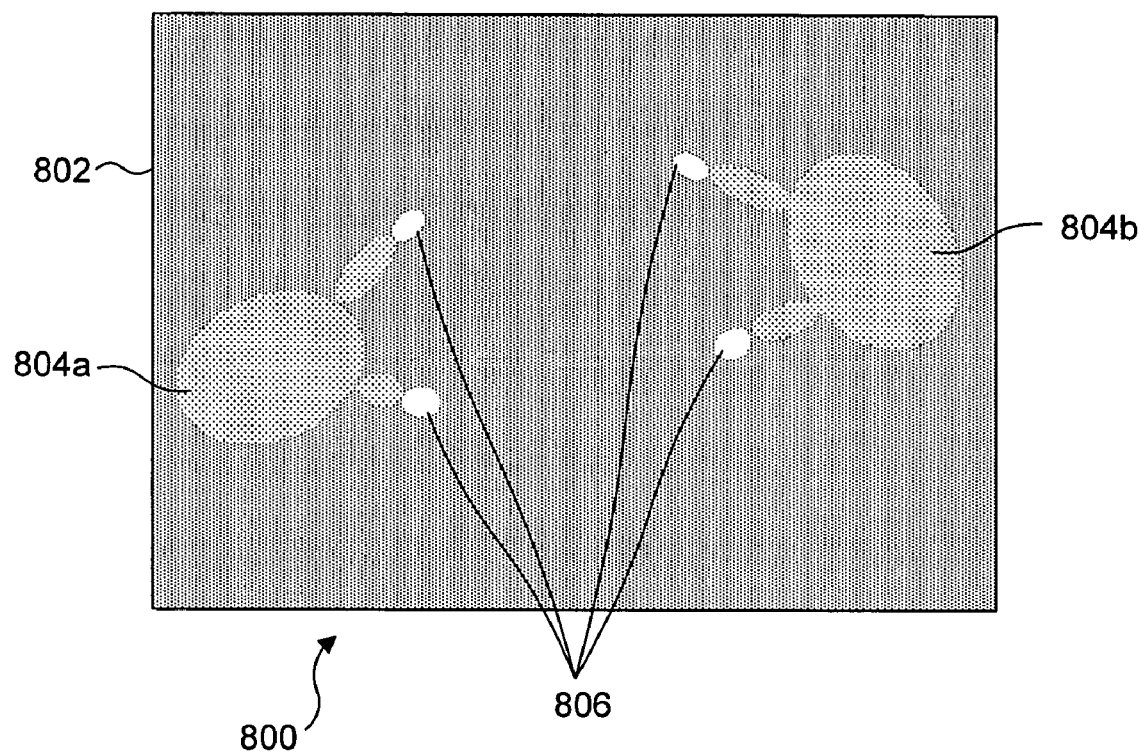
Figure 8B:
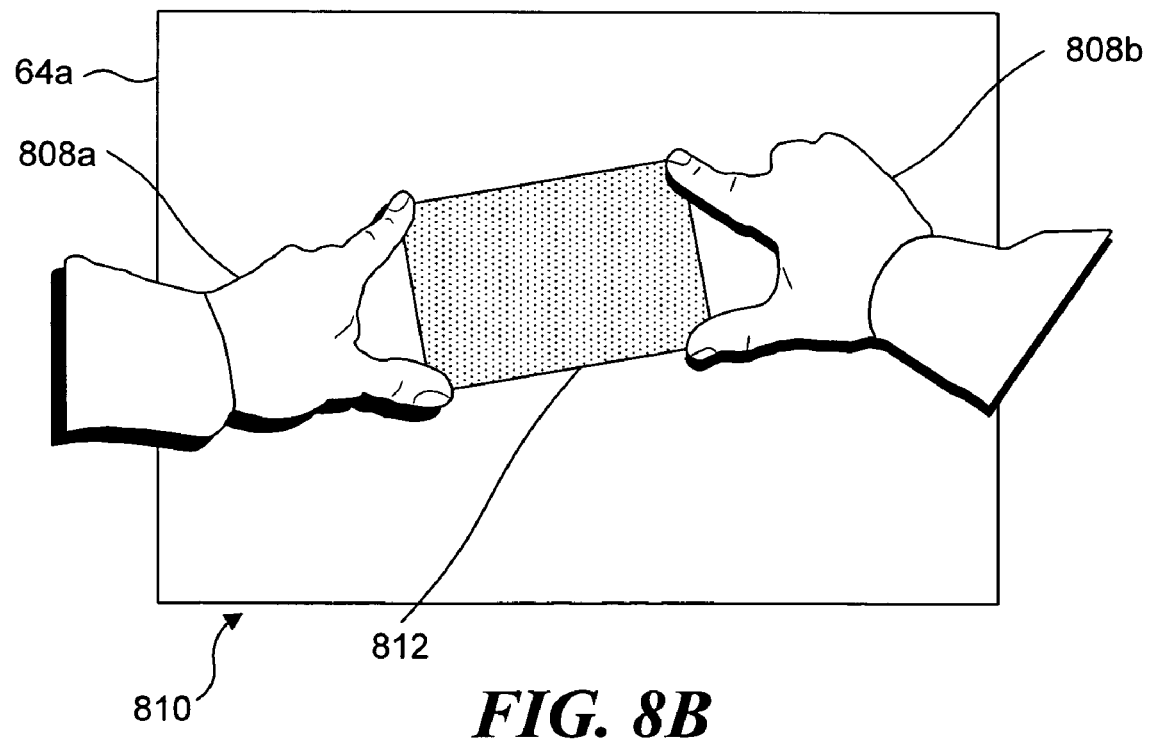
Figure 9A:
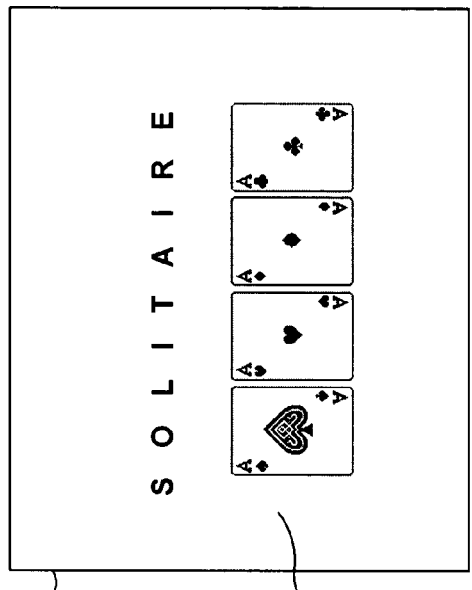
Figure 9B:
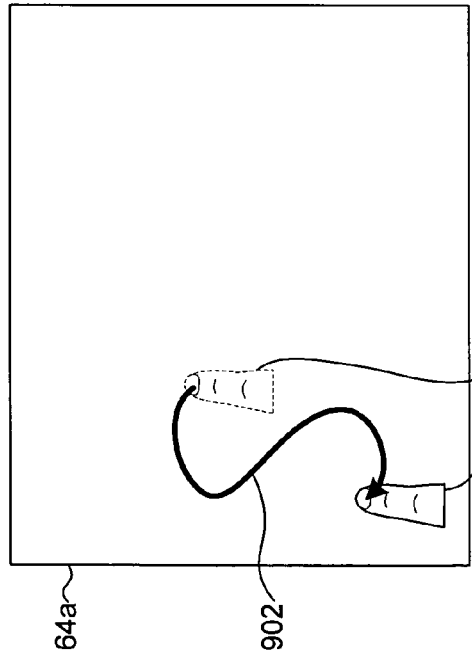
Figure 9C:
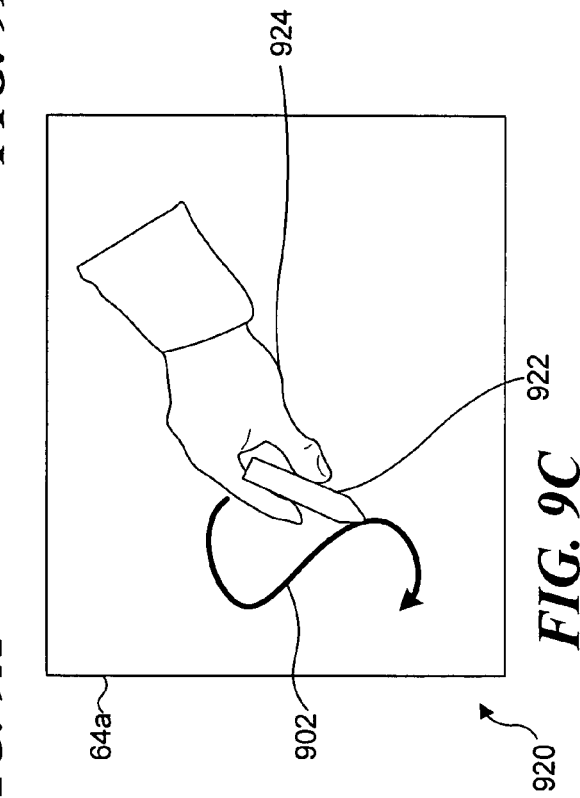
Figure 10A:
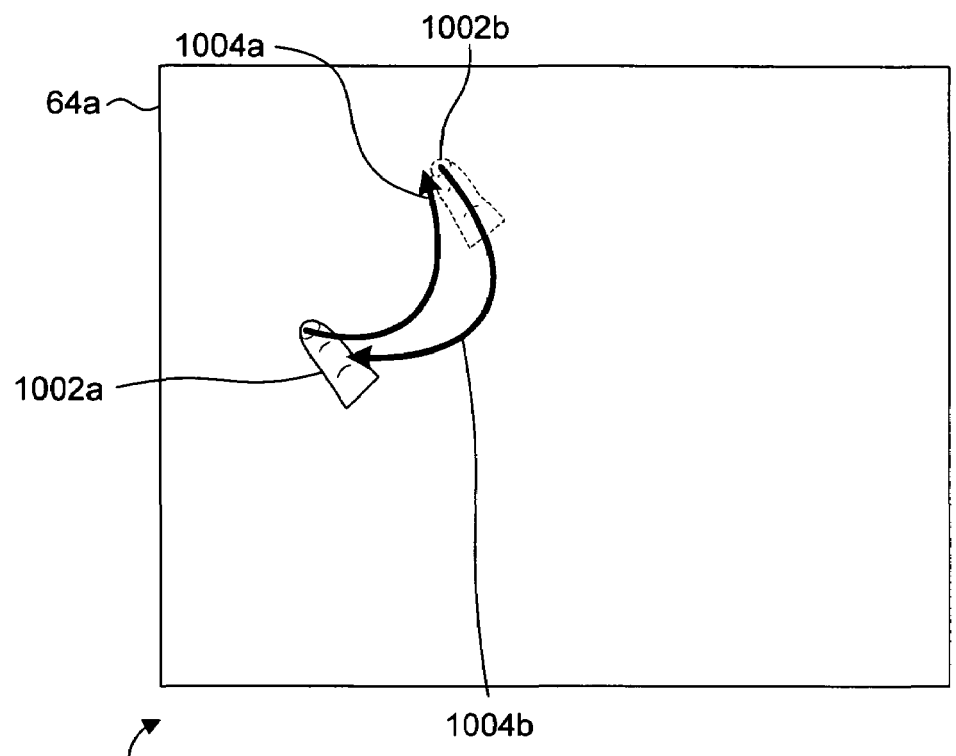
Figure 10B:
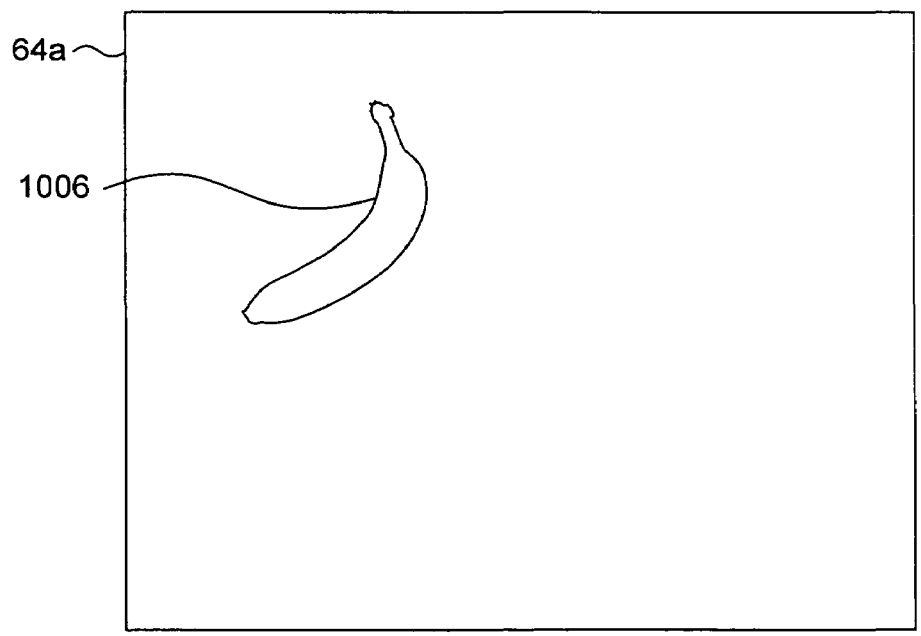
Figure 12:
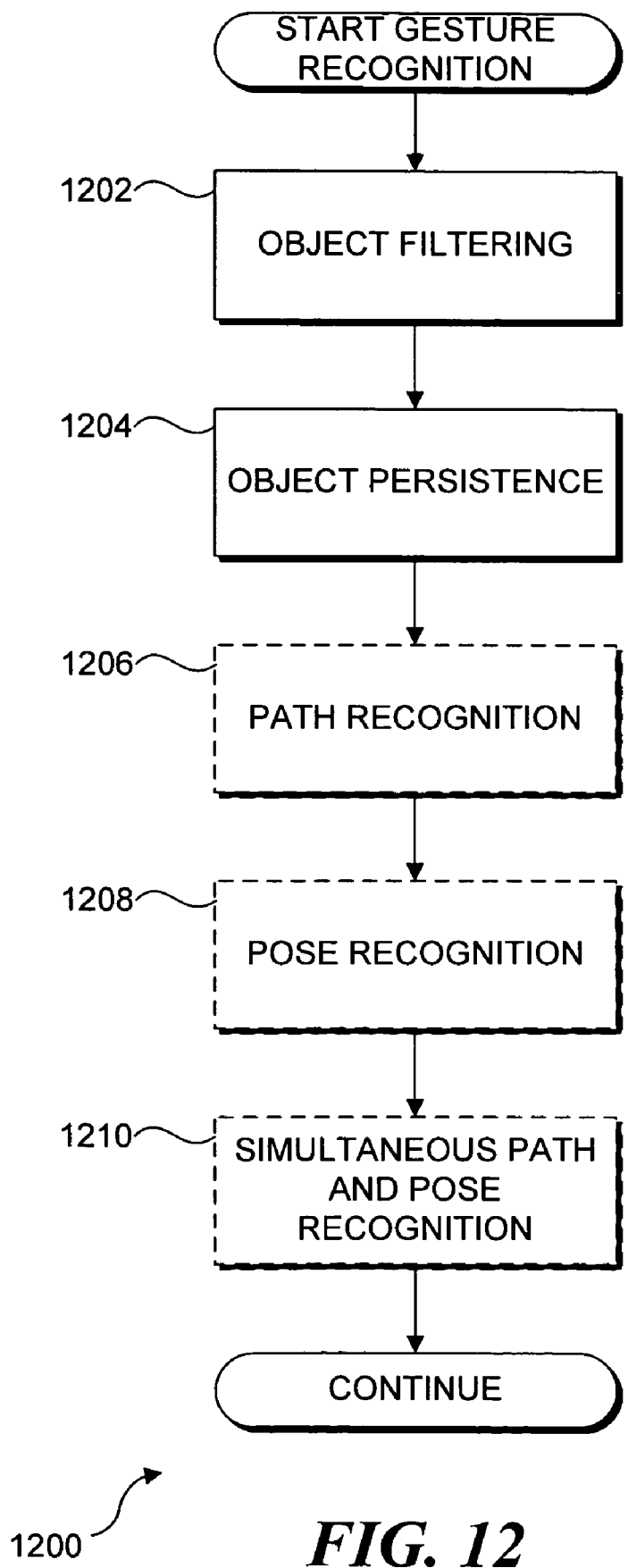
Figure 13:
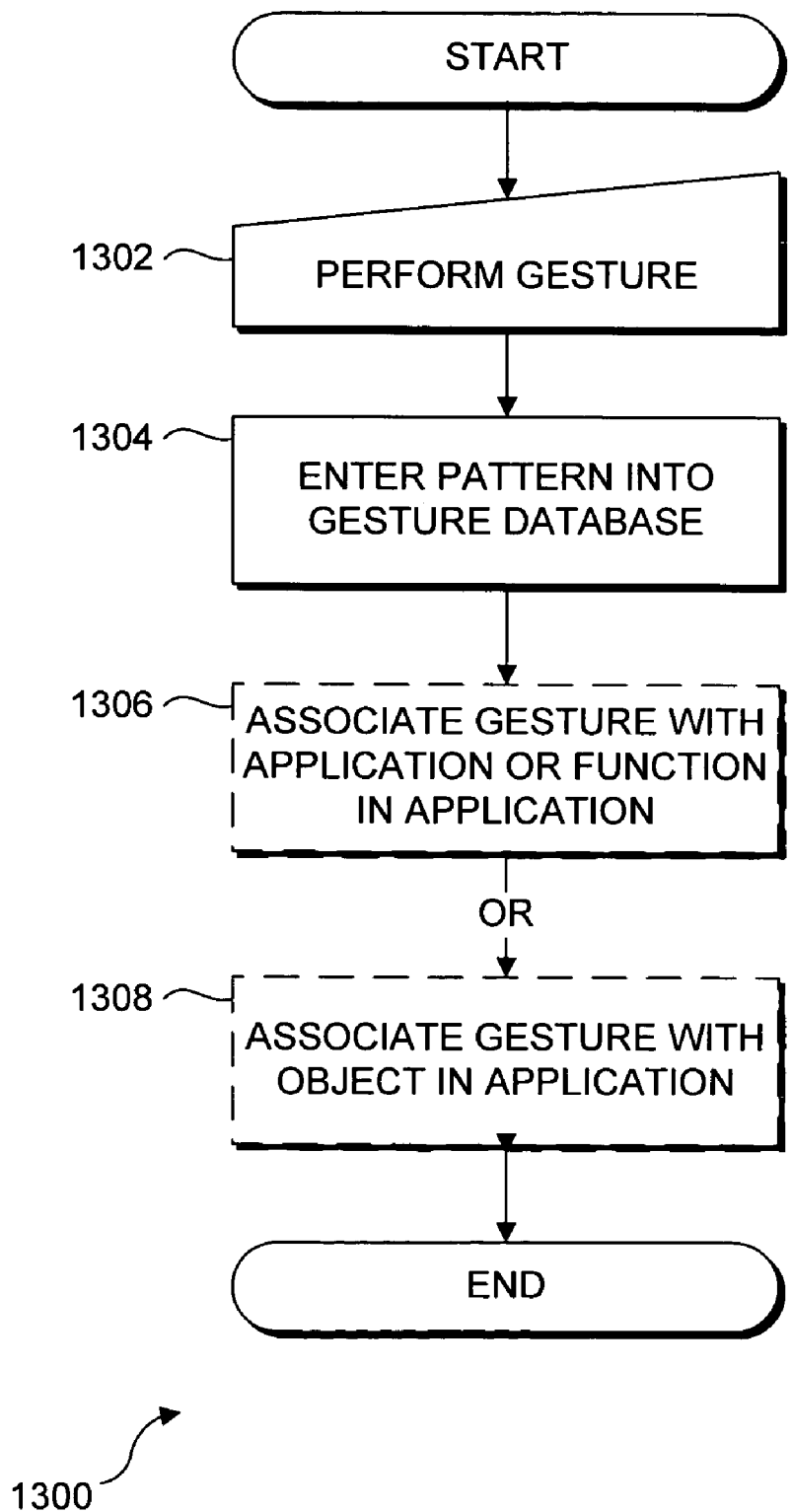
Figure 14:
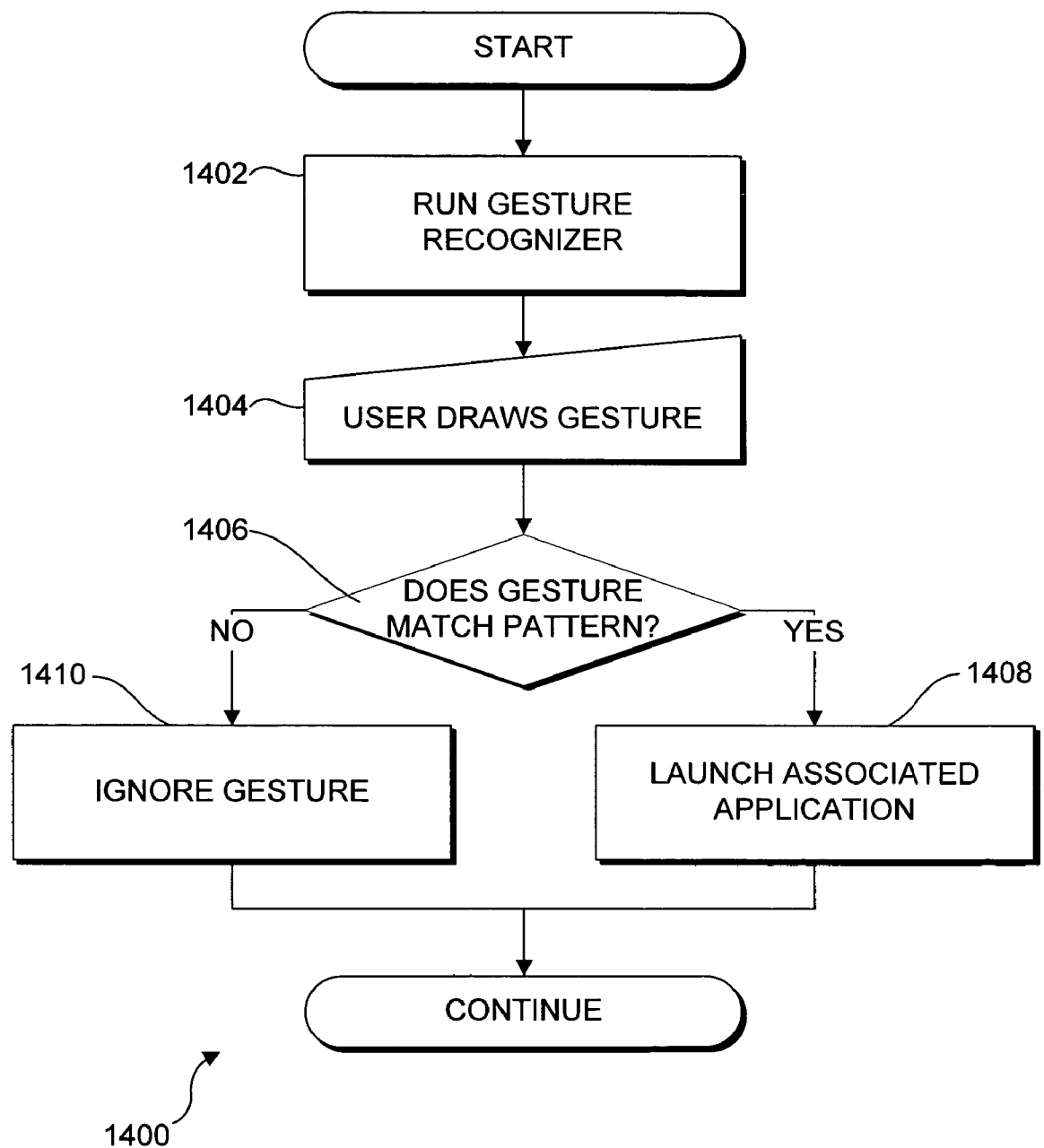
Figure 15:
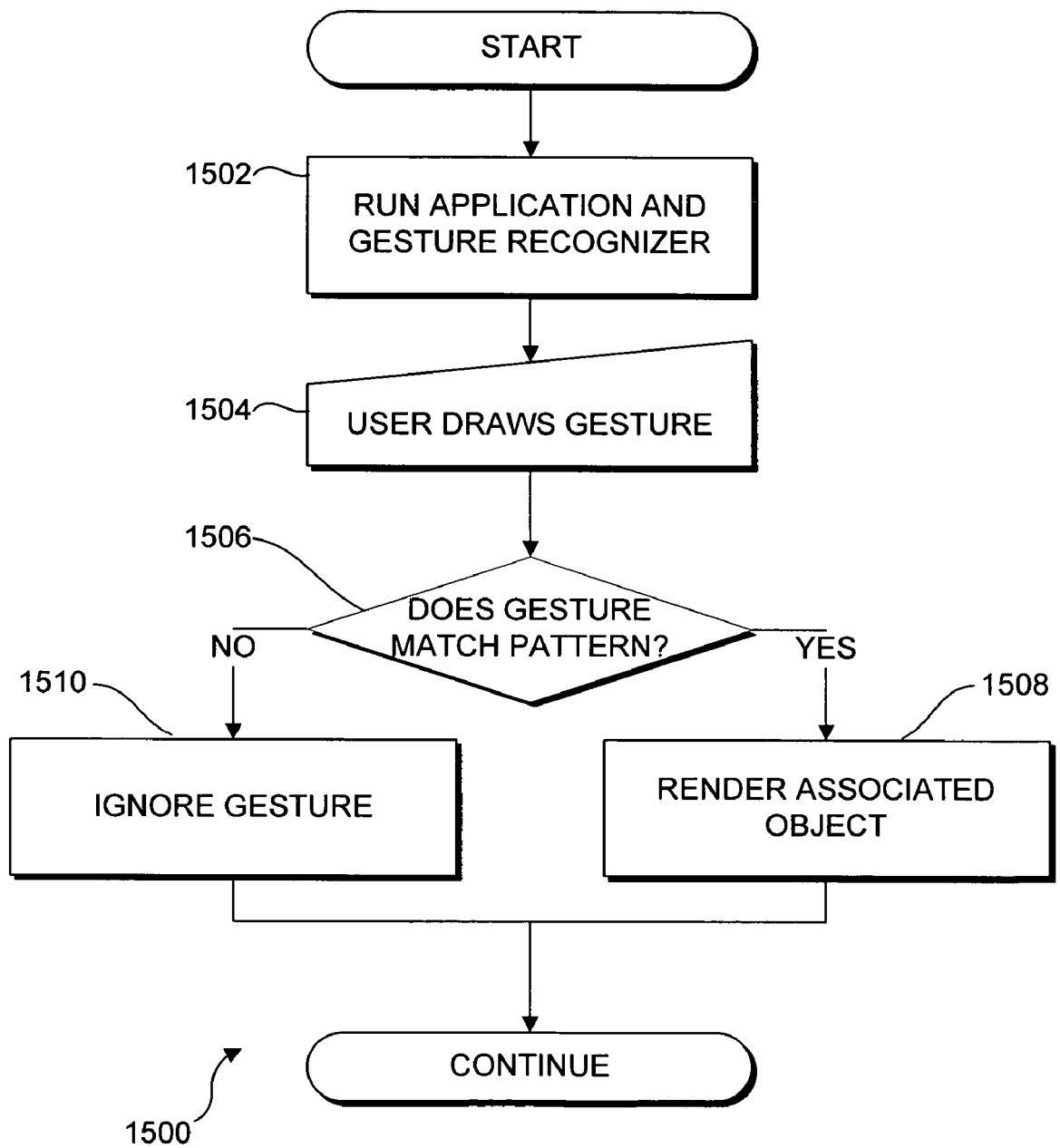
Figure 16:
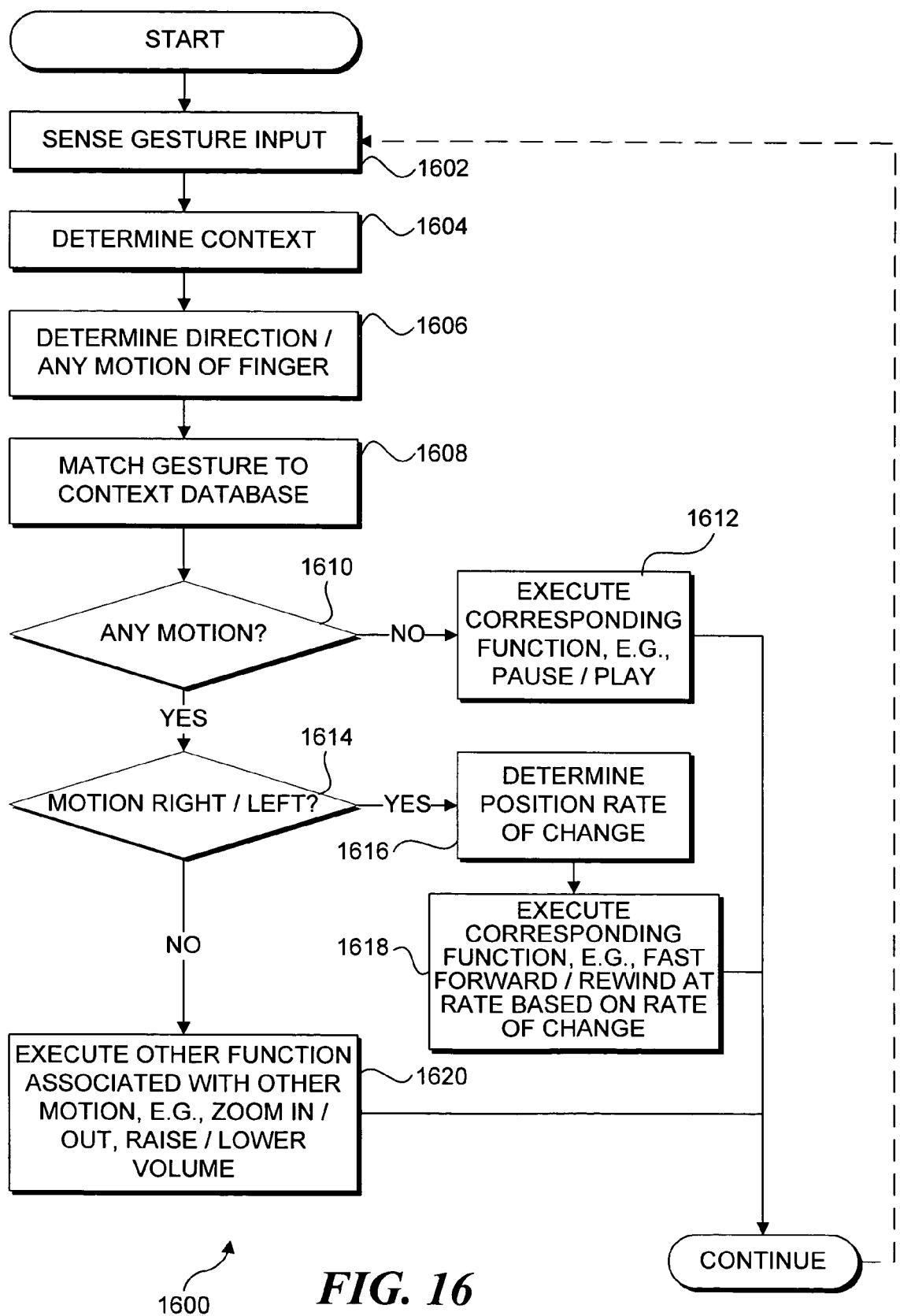

FIGS. 6A, 6C, and 6E illustrate the connected components sensed by the interactive display table in response to three successive positions of a user's hand with extended forefinger and thumb in close proximity to the display surface, as the hand moves over the display surface in a sweeping gesture, shown in FIGS. 6B, 6D, and 6F;

FIG. 7A illustrates the connected components detected by the interactive display table corresponding to an inferred hand "pose" shown in FIG. 7B;

FIG. 8A illustrates the connected components detected by the interactive display table and FIG. 8B illustrates the inferred "poses" of the users hands, forefingers, and thumbs, and the meaning for the hand poses;

FIGS. 9A and 9B respectively illustrate a gesture and an application executed upon the interactive display table detecting the gesture;

FIG. 9C illustrates how an object grasped by a user can also be used to cause a virtual object to be displayed on the interactive display table;

FIGS. 10A and 10B respectively illustrate a gesture and a virtual object that is displayed upon the interactive display table detecting the gesture;

FIGS. 11A-11F illustrate gestures being used for controlling a video playback;

FIG. 12 is a flow chart showing a process for gesture detection and recognition;

FIG. 13 is a flow chart showing a process for associating a gesture with an application, or with a function, or an object within an application;

FIG. 14 is a flow chart showing a process for launching an application by making a gesture associated with the application;

FIG. 15 is a flow chart showing a process for rendering a virtual object in response to a gesture; and FIG. 16 is a flow chart showing a process for controlling video playback in response to gestures.

DESCRIPTION OF THE PREFERRED EMBODIMENT

Exemplary Computing System for Implementing Present Invention

Figure 1:
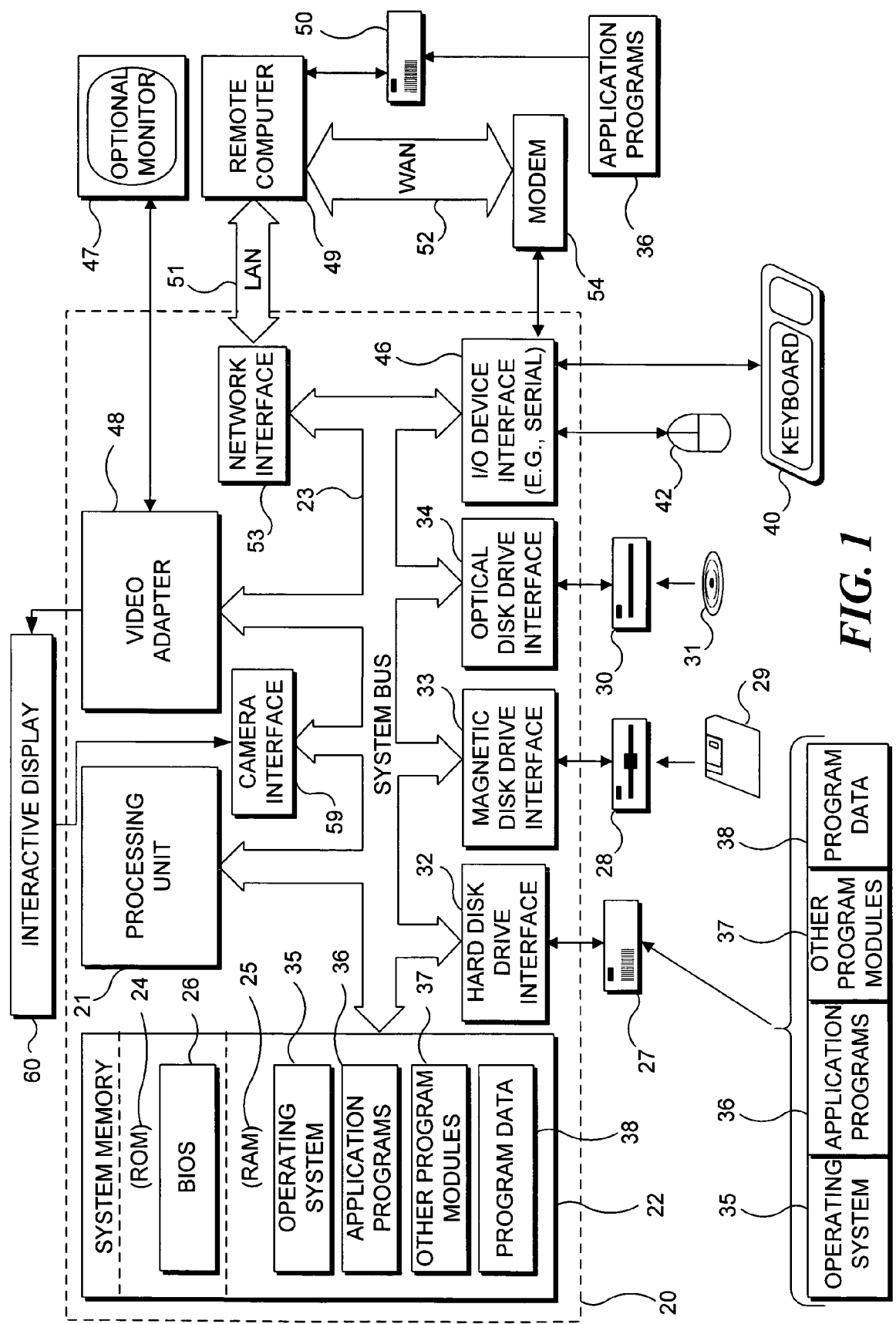
FIG. 1 is a functional block diagram of a generally conventional computing device or personal computer (PC) that is suitable for image processing in connection with the interactive display table, in accord with the present invention.

With reference to FIG. 1, an exemplary system suitable for implementing various portions of the present invention is shown. The system includes a general purpose computing device in the form of a conventional PC 20, provided with a processing unit 21, a system memory 22, and a system bus 23. The system bus couples various system components including the system memory to processing unit 21 and may be any of several types of bus structures, including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the PC 20, such as during start up, is stored in ROM 24. PC 20 further includes a hard disk drive 27 for reading from and writing to a hard disk (not shown), a magnetic disk drive 28 for reading from or writing to a removable magnetic disk 29, and an optical disk drive 30 for reading from or writing to a removable optical disk 31, such as a compact disk-read only memory (CD-ROM) or other optical media. Hard disk drive 27, magnetic disk drive 28, and optical disk drive 30 are connected to system bus 23 by a hard disk drive interface 32, a magnetic disk drive interface 33, and an optical disk drive interface 34, respectively. The drives and their associated computer readable media provide nonvolatile storage of computer readable machine instructions, data structures, program modules, and other data for PC 20. Although the exemplary environment described herein employs a hard disk, removable magnetic disk 29, and removable optical disk 31, it will be appreciated by those skilled in the art that other types of computer readable media, which can store data and machine instructions that are accessible by a computer, such as magnetic cassettes, flash memory cards, digital video disks (DVDs), Bernoulli cartridges, RAMs, ROMs, and the like, may also be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information in PC 20 and provide control input through input devices, such as a keyboard 40 and a pointing device 42. Pointing device 42 may include a mouse, stylus, wireless remote control, or other pointer, but in connection with the present invention, such conventional pointing devices may be omitted, since the user can employ the interactive display for input and control. As used hereinafter, the term "mouse" is intended to encompass virtually any pointing device that is useful for controlling the position of a cursor on the screen. Other input devices (not shown) may include a microphone, joystick, haptic joystick, yoke, foot pedals, game pad, satellite dish, scanner, or the like. These and other input/output (I/O) devices are often connected to processing unit 21 through an I/O interface 46 that is coupled to the system bus 23. The term I/O interface is intended to encompass each interface specifically used for a serial port, a parallel port, a game port, a keyboard port, and/or a universal serial bus (USB). System bus 23 is also connected to a camera interface 59, which is coupled to an interactive display 60 to receive signals form a digital video camera that is included therein, as discussed below. The digital video camera may be instead coupled to an appropriate serial I/O port, such as to a USB version 2.0 port. Optionally, a monitor 47 can be connected to system bus 23 via an appropriate interface, such as a video adapter 48; however, the interactive display of the present invention can provide a much richer display and interact with the user for input of information and control of software applications and is therefore preferably coupled to the video adaptor. It will be appreciated that PCs are often coupled to other peripheral output devices (not shown), such as speakers (through a sound card or other audio interface—not shown) and printers.

The present invention may be practiced on a single machine, although PC 20 can also operate in a networked environment using logical connections to one or more remote computers, such as a remote computer 49. Remote computer 49 may be another PC, a server (which is typically generally configured much like PC 20), a router, a network PC, a peer device, or a satellite or other common network node, and typically includes many or all of the elements described above in connection with PC 20, although only an external memory storage device 50 has been illustrated in FIG. 1. The logical connections depicted in FIG. 1 include a local area network (LAN) 51 and a wide area network (WAN) 52. Such networking environments are common in offices, enterprise wide computer networks, intranets, and the Internet.

When used in a LAN networking environment, PC 20 is connected to LAN 51 through a network interface or adapter 53. When used in a WAN networking environment, PC 20 typically includes a modem 54, or other means such as a cable modem, Digital Subscriber Line (DSL) interface, or an Integrated Service Digital Network (ISDN) interface for establishing communications over WAN 52, such as the Internet. Modem 54, which may be internal or external, is connected to the system bus 23 or coupled to the bus via I/O device interface 46, i.e., through a serial port. In a networked environment, program modules, or portions thereof, used by PC 20 may be stored in the remote memory storage device. It will be appreciated that the network connections shown are exemplary and other means of establishing a communications link between the computers may be used, such as wireless communication and wide band network links.

Exemplary Interactive Surface

Figure 2:
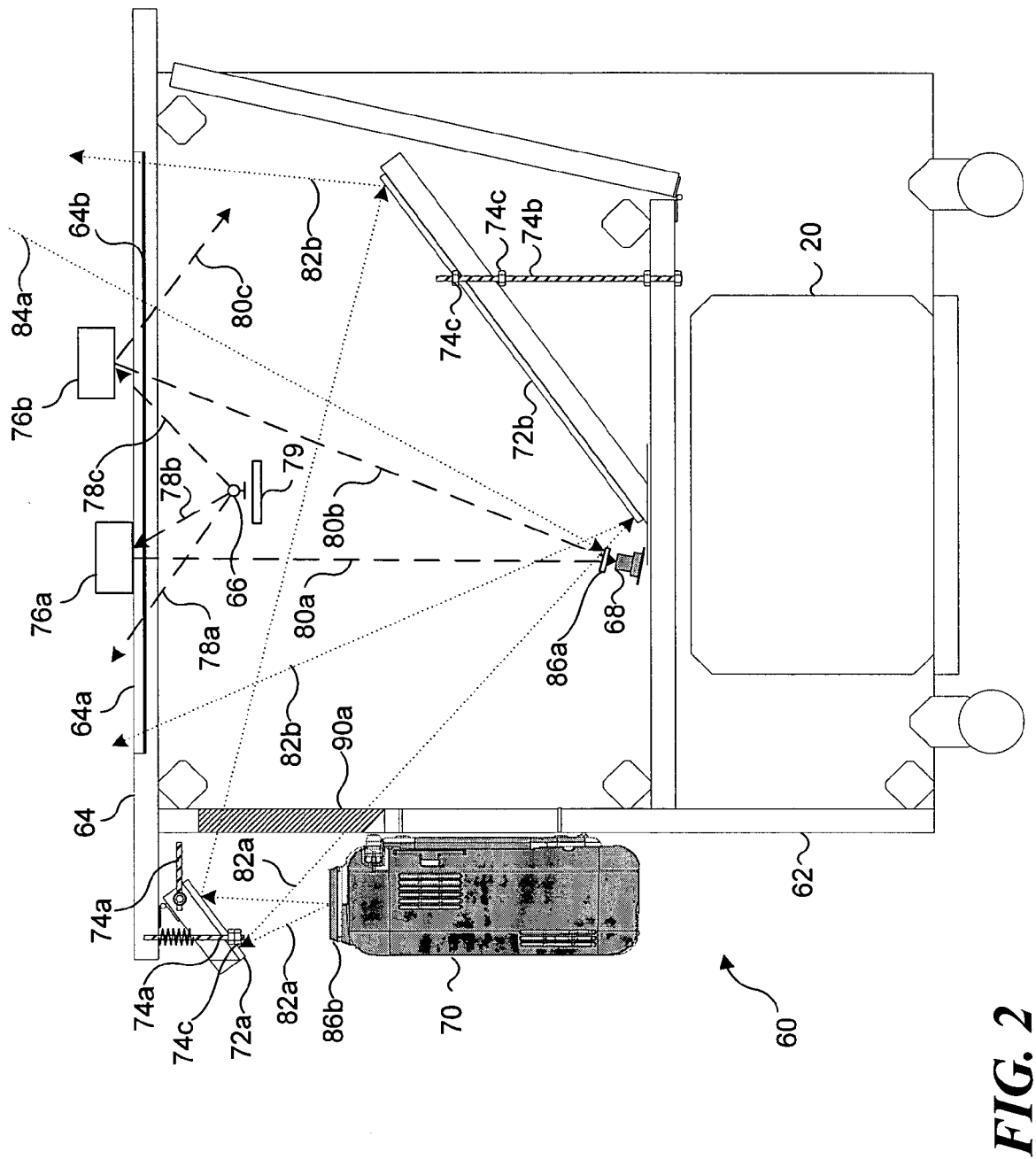
FIG. 2 is a cut-away view elevational showing the interior of the interactive display table, the paths followed by light within the interactive display table, and exemplary objects disposed on and above the display surface of the interactive display table.

In FIG. 2, an exemplary interactive display table 60 is shown that includes PC 20 within a frame 62 and which serves as both an optical input and video display device for the computer. In this cut-away Figure of the interactive display table, rays of light used for displaying text and graphic images are generally illustrated using dotted lines, while rays of infrared (IR) light used for sensing objects on or just above a display surface 64a of the interactive display table are illustrated using dash lines. Display surface 64a is set within an upper surface 64 of the interactive display table. The perimeter of the table surface is useful for supporting a user's arms or other objects, including objects that may be used to interact with the graphic images or virtual environment being displayed on display surface 64a.

IR light sources 66 preferably comprise a plurality of IR light emitting diodes (LEDs) and are mounted on the interior side of frame 62. The IR light that is produced by IR light sources 66 is directed upwardly toward the underside of display surface 64a, as indicated by dash lines 78a, 78b, and 78c. the IR light from IR light sources 66 is reflected from any objects that are atop or proximate to the display surface after passing through a translucent layer 64b of the table, comprising a sheet of vellum or other suitable translucent material with light diffusing properties. Although only one IR source 66 is shown, it will be appreciated with a plurality of such IR sources may be mounted at spaced-apart locations around the interior sides of frame 62 to prove an even illumination of display surface 64a. The infrared light produced by the IR sources may:

exit through the table surface without illuminating any objects, as indicated by dash line 78a;

illuminate objects on the table surface, as indicated by dash line 78b; or illuminate objects a short distance above the table surface but not touching the table surface, as indicated by dash line 78c.

Objects above display surface 64a include a "touch" object 76a that rests atop the display surface and a "hover" object 76b that is close to but not in actual contact with the display surface. As a result of using translucen layer 64b under the display surface to diffuse the IR light passing through the display surface, as an object approaches the top of display surface 64a, the amount of IR light that is reflected by the object increases to a maximum level that is achieved when the object is actually in contact with the display surface.

A digital video camera 68 is mounted to frame 62 below display surface 64a in a position appropriate to receive IR light that is reflected from any touch object or hover object disposed above display surface 64a. Digital video camera 68 is equipped with an IR pass filter 86a that transmits only IR light and blocks ambient visible traveling through display surface 64a along dotted line 84a. A baffle 79 is disposed between IR source 66 and the digital video camera to prevent IR light that is directly emitted from the IR source from entering the digital video camera, since it is preferable that this digital video camera should produce an output signal that is only responsive to the IR light reflected from objects that are a short distance above or in contact with display surface 64a and corresponds to an image of IR light reflected from objects on or above the display surface. It will be apparent that digital video camera 68 will also respond to any IR light included in the ambient light that passes through display surface 64a from above and into the interior of the interactive display (e.g., ambient IR light that also travels along the path indicated by dotted line 84a).

IR light reflected from objects on or above the table surface may be:

reflected back through translucent layer 64b, through IR pass filter 86a and into the lens of digital video camera 68, as indicated by dash lines 80a and 80b; or reflected or absorbed by other interior surfaces within the interactive display without entering the lens of digital video camera 68, as indicated by dash line 80c.

Translucent layer 64b diffuses both incident and reflected IR light. Thus, as explained above, "hover" objects that are closer to display surface 64a will reflect more IR light back to digital video camera 68 than objects of the same reflectivity that are farther away from the display surface. Digital video camera 68 senses the IR light reflected from "touch" and "hover" objects within its imaging field and produces a digital signal corresponding to images of the reflected IR light that is input to PC 20 for processing to determine a location of each such object, and optionally, the size, orientation, and shape of the object. It should be noted that a portion of an object (such as a user's forearm) may be above the table while another portion (such as the user's finger) is in contact with the display surface. In addition, an object may include an IR light reflective pattern or coded identifier (e.g., a bar code) on its bottom surface that is specific to that object or to a class of related objects of which that object is a member. Accordingly, the imaging signal from digital video camera 68 can also be used for detecting each such specific object, as well as determining its orientation, based on the IR light reflected from its reflective pattern, or based upon the shape of the object evident in the image of the reflected IR light, in accord with the present invention. The logical steps implemented to carry out this function are explained below.

Figure 3:
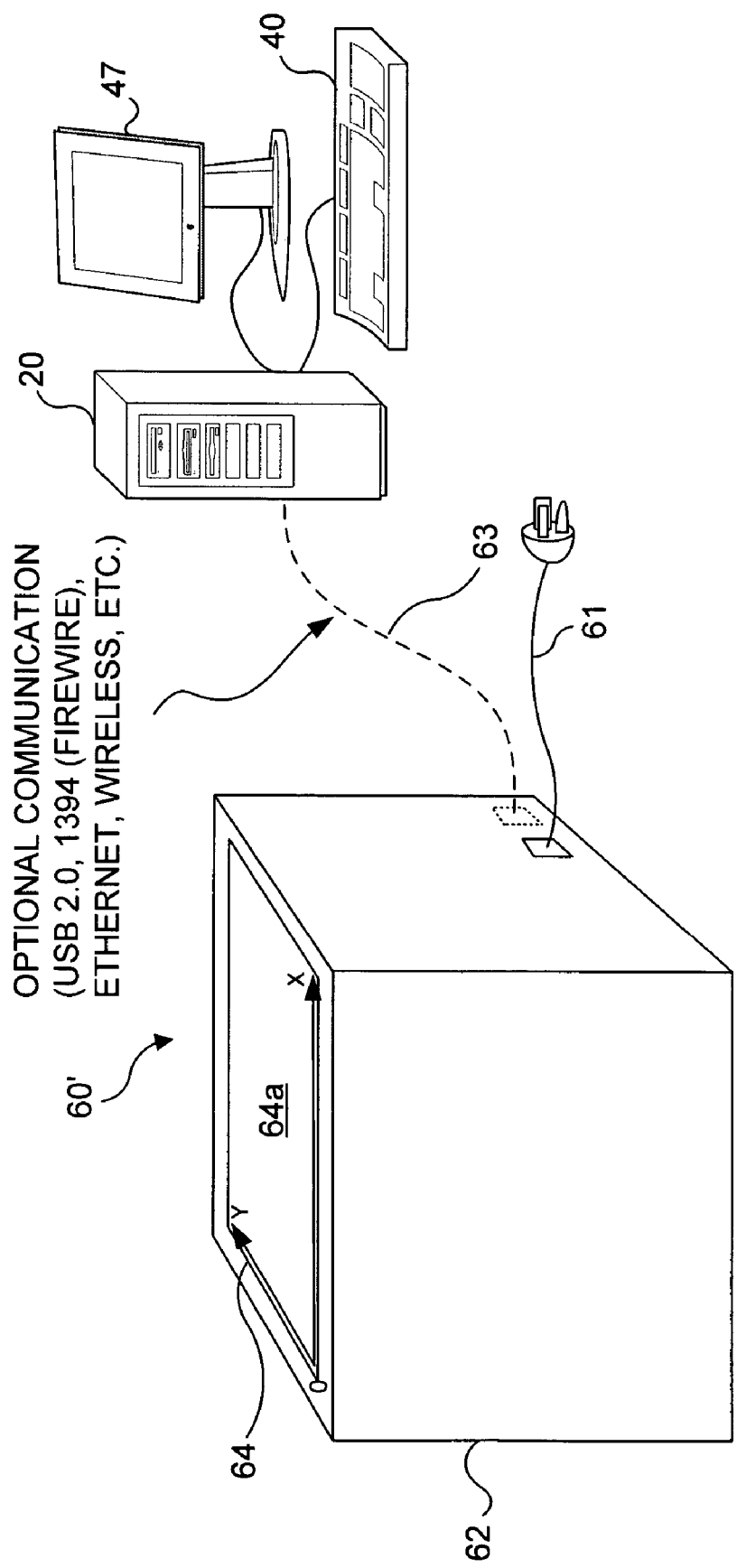
FIG. 3 is an isometric view of an embodiment of the interactive display table that is coupled to an external PC.

PC 20 may be integral to interactive display table 60 as shown in FIG. 2, or alternatively, may instead be external to the interactive display table, as shown in the embodiment of FIG. 3. In FIG. 3, an interactive display table 60' is connected through a data cable 63 to an external PC 20 (which includes optional monitor 47, as mentioned above). As also shown in this Figure, a set of orthogonal X and Y axes are associated with display surface 64a, as well as an origin indicated by "0." While not discretely shown, it will be appreciated that a plurality of coordinate locations along each orthogonal axis can be employed to specify any location on display surface 64a.

If the interactive display table is connected to an external PC 20 (as in FIG. 3) or to some other type of external computing device, such as a set top box, video game, laptop computer, or media computer (not shown), then the interactive display table comprises an input/output device. Power for the interactive display table is provided through a power lead 61, which is coupled to a conventional alternating current (AC) source (not shown). Data cable 63, which connects to interactive display table 60', can be coupled to a USB 2.0 port, an Institute of Electrical and Electronics Engineers (IEEE) 1394 (or Firewire) port, or an Ethernet port on PC 20. It is also contemplated that as the speed of wireless connections continues to improve, the interactive display table might also be connected to a computing device such as PC 20 via such a high speed wireless connection, or via some other appropriate wired or wireless data communication link. Whether included internally as an integral part of the interactive display, or externally, PC 20 executes algorithms for processing the digital images from digital video camera 68 and executes software applications that are designed to use the more intuitive user interface functionality of interactive display table 60 to good advantage, as well as executing other software applications that are not specifically designed to make use of such functionality, but can still make good use of the input and output capability of the interactive display table. As yet a further alternative, the interactive display can be coupled to an external computing device, but include an internal computing device for doing image processing and other tasks that would then not be done by the external PC.

An important and powerful feature of the interactive display table (i.e., of either embodiments discussed above) is its ability to display graphic images or a virtual environment for games or other software applications and to enable an interaction between the graphic image or virtual environment visible on display surface 64a and identify patterned objects that are resting atop the display surface, such as a patterned object 76a, or are hovering just above it, such as a patterned object 76b.

Again referring to FIG. 2, interactive display table 60 includes a video projector 70 that is used to display graphic images, a virtual environment, or text information on display surface 64a. The video projector is preferably of a liquid crystal display (LCD) or digital light processor (DLP) type, or a liquid crystal on silicon (LCoS) display type, with a resolution of at least 640×480 pixels. An IR cut filter 86b is mounted in front of the projector lens of video projector 70 to prevent IR light emitted by the video projector from entering the interior of the interactive display table where the IR light might interfere with the IR light reflected from object(s) on or above display surface 64a. A first mirror assembly 72a directs projected light traveling from the projector lens along dotted path 82a through a transparent opening 90a in frame 62, so that the projected light is incident on a second mirror assembly 72b. Second mirror assembly 72b reflects the projected light onto translucent layer 64b, which is at the focal point of the projector lens, so that the projected image is visible and in focus on display surface 64a for viewing.

Alignment devices 74a and 74b are provided and include threaded rods and rotatable adjustment nuts 74c for adjusting the angles of the first and second mirror assemblies to ensure that the image projected onto the display surface is aligned with the display surface. In addition to directing the projected image in a desired direction, the use of these two mirror assemblies provides a longer path between projector 70 and translucent layer 64b, and more importantly, helps in achieving a desired size and shape of the interactive display table, so that the interactive display table is not too large and is sized and shaped so as to enable the user to sit comfortably next to it.

Inferring Hand Position

Objects that are either in contact with the displays surface or are proximate to it are sensed by detecting the pixels comprising a connected component in the image produced by IR video camera 68, in response to reflected IR light from the objects that is above a predefined intensity level. To comprise a connected component, the pixels must be adjacent to other pixels that are also above the predefined intensity level. Different predefined threshold intensity levels can be defined for hover objects, which are proximate to but not in contact with the display surface, and touch objects, which are in actual contact with the display surface. Thus, there can be hover connected components and touch connected components. Details of the logic involved in identifying objects, their size, and orientation based upon processing the reflected IR light from the objects to determine connected components are set forth in a commonly assigned, co-pending patent application Ser. No. 10/814,761, entitled "Determining Connectedness and Offset of 3d Objects Relative to An Interactive Surface," which was filed Mar. 31, 2004, the specification and drawings of which are hereby specifically incorporated herein by reference.

As a user moves one or more fingers of the same hand across the display surface of the interactive table, with the fingers tips touching the display surface, both touch and hover connected components are sensed by the IR video camera of the interactive display table. The finger tips are recognized as touch objects, while the portion of the hand, wrist, and forearm that are sufficiently close to the display surface, are identified as hover object(s). The relative size, orientation, and location of the connected components comprising the pixels disposed in these areas of the display surface comprising the sensed touch and hover components can be used to infer the position and orientation of a user's hand and digits (i.e., fingers and/or thumb). As used herein and in the claims that follow, the term "finger" and its plural form "fingers" are broadly intended to encompass both finger(s) and thumb(s), unless the use of these words indicates that "thumb" or "thumbs" are separately being considered in a specific context.

Figure 4A:
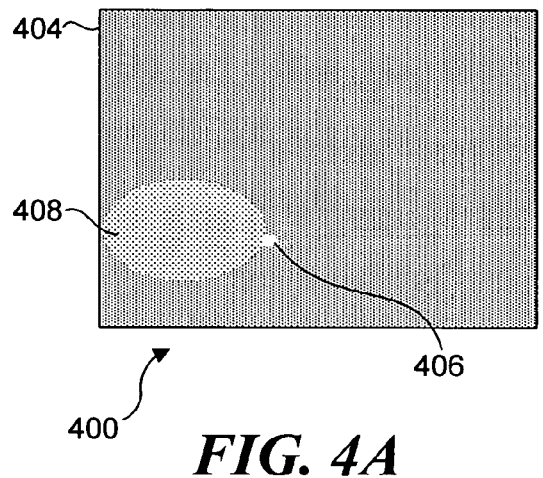
FIG. 4A illustrates the connected components detected by the interactive display table in response to a gesture and FIG. 4B illustrates the gesture, in which the user's forefinger is in close proximity to the display surface.
Figure 4B:
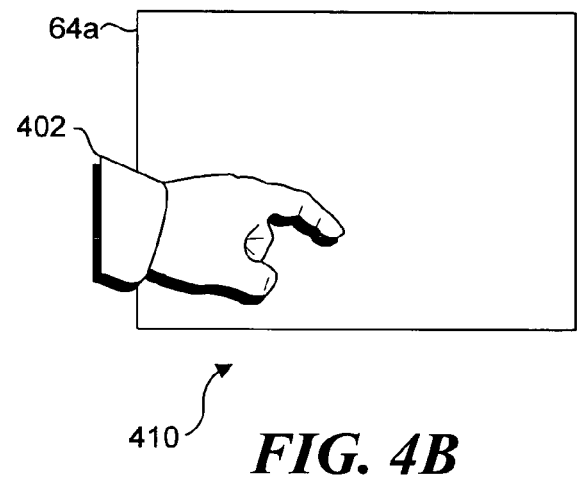

In FIG. 4A, an illustration 400 shows, in an exemplary manner, a sensed input image 404. Note that the image is sensed through the diffusing layer of the display surface. The input image comprises a touch connected component 406 and a hover connected component 408. In FIG. 4B, an illustration 410 shows, in an exemplary manner, an inferred hand 402 above the display surface that corresponds to hover connected component 408 in FIG. 4A. The index finger of the inferred hand is extended and the tip of the finger is in physical contact with the display surface whereas the remainder of the finger and hand is not touching the display surface. The finger tip that is in contact with the display surface thus corresponds to touch connected component 406.

Figure 4C:
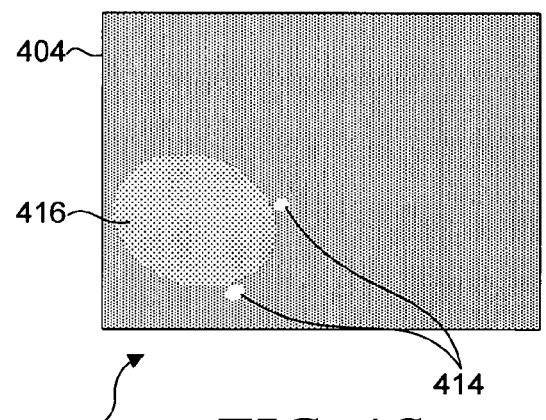
FIG. 4C illustrates connected components detected by the interactive display table in response to a gesture.
Figure 4D:
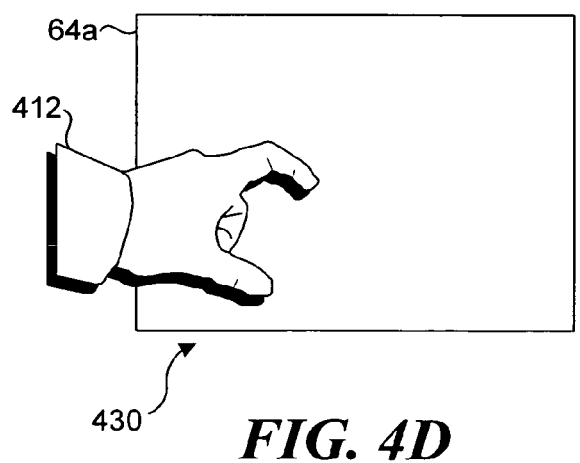
FIG. 4D illustrates the gesture, in which the user's forefinger and thumb are in close proximity to the display surface.

Similarly, in FIG. 4C, an illustration 420 shows, in an exemplary manner, a sensed input image 404. Again, the image of the objects above and in contact with the display surface is sensed through the diffusing layer of the display surface. The input image comprises two touch connected components 414, and a hover connected component 416. In FIG. 4D, an illustration 430 shows, in an exemplary manner, an inferred hand 412 above the display surface. The index finger and the thumb of the inferred hand are extended and in physical contact with the display surface, thereby corresponding to touch connected components 414, whereas the remainder of the fingers and the hand are not touching the display surface and therefore correspond to hover connected component 416.

Figure 5A:
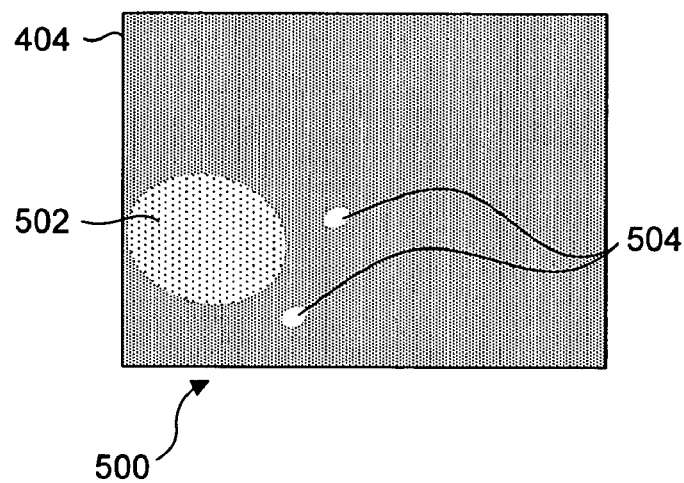
FIG. 5A illustrates the connected components detected by the interactive display table in response to a gesture.
Figure 5B:
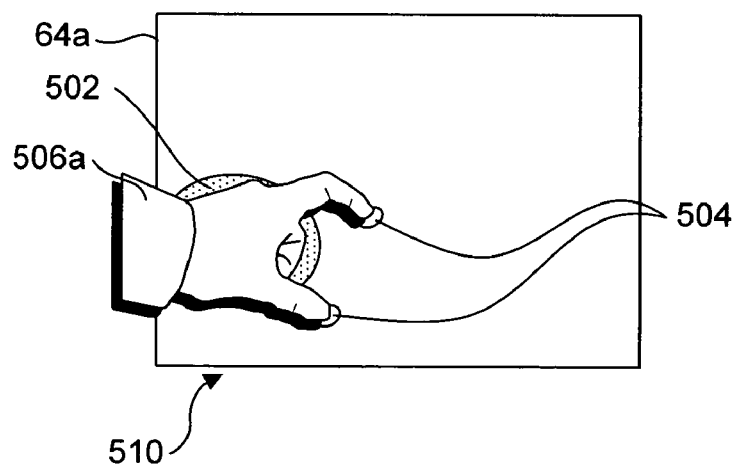
FIGS. 5B and 5C illustrate two gestures made by different orientations of a user's hand, both of which correspond to the connected components of FIG. 5A.
Figure 5C:
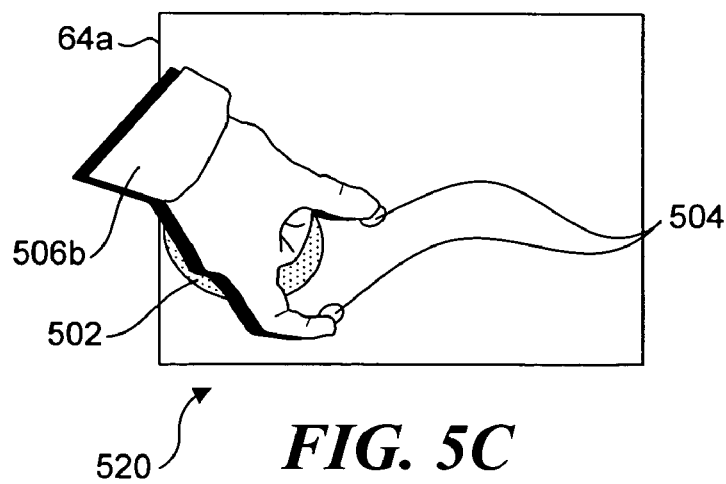

FIGS. 5A-5C illustrate, in an exemplary manner, how two possible hand positions and orientations can be inferred by the interactive display table, based upon a single set of connected components. As shown in an illustration 500 in FIG. 5A, a sensed input image comprises two touch connected components 504, and a hover connected component 502. In illustrations 510 and 520 of FIGS. 5B and 5C, respectively, two different positions and orientations of a hand are inferred, based upon the same set of connected components. In FIG. 5B, the inference is of a left hand 506a reaching from the left side of the image. In FIG. 5C, the inference is a right hand 506b reaching down from the left side of the image. (It will be understood that the hover and touch connected components shown behind the hands in FIGS. 5B and 5C are for illustrative purposes only and would not be visible on the display surface from above.) In each case, the tips of the finger and thumb coincide with touch connected components 504, and the hand and wrist generally coincide with hover connected component 502. Generally, other hand positions and orientations are not possible given the sensed input image in FIG. 5A, although other fingers besides the forefinger might be used to touch the display screen. (It will be understood that the hover and touch connected components shown behind the hands in FIGS. 5B and 5C are for illustrative purposes only and would not be visible on the display surface from above.)

FIGS. 6A-6F illustrate, in an exemplary manner, how any ambiguity in orientation is reduced as a user's hand moves across the display surface. In FIGS. 6A, 6C, and 6D, illustrations 600, 610, and 620 respectively show hover connected component 602a, 602b, and 602c, and touch connected components 604a, 604b, and 604c of sensed input images 606a, 606b, and 606c, respectively. As a user's hand moves across the display surface, hover connected components tend to elongate along the longitudinal direction of the user's arm, reducing the ambiguity of the orientation of the user's hand. Thus, for each of FIGS. 6B, 6D, and 6F, the interactive display table infers a hovering hand and touching fingers above the display surface as shown in illustrations 600', 610', and 620', respectively. (Again, the hover and touch connected components appearing behind the hand in illustrations 600', 610', and 620' are for illustrative purposes only and are not actually visible from above the display surface.)

FIGS. 7A and 7B illustrate, in an exemplary manner, the interactive display table inference of a hand posture, which is useful in detecting a specific gesture. A user can directly indicate a hand position and orientation by using a predefined hand posture. In an illustration 700 in FIG. 7A, a sensed input image 702 comprises a hover connected component 704 and touch connected components 706. Hover connected components 704 include the portions of the user's forefinger and thumb that are above the display surface, as well as the rest of the hand. An illustration 710 in FIG. 7B shows the interactive display table inference of a hand 708 in a specific pose, as determined from the different lengths of the hover connected components 704 of the input image.

The interactive display table can infer multiple hands disposed above or in contact with the display surface, for common interactions such as resizing virtual objects or selecting sets of objects. FIGS. 8A and 8B illustrate, in an exemplary manner, how the interactive display table infers multiple hands being used for selecting a region of the display surface. In an illustration 800 in FIG. 8A, a sensed input image 802 comprises hover connected components 804a and 804b, and touch connected components 806. An illustration 810 in FIG. 8B shows that the interactive display table infers two hands 808a and 808b, as determined from the connected components of the input image. Based upon the relationship of hands 808a and 808b, as detected by the interactive display table, a bounding box 812 is drawn on the display surface with corners corresponding to the positions of the touch connected components produced by the thumb and forefinger of each hand. It will be apparent that the user can resize bounding box 812 by moving either or both hands 808a and 808b. If the bounding box represents an image or virtual object that is being displayed on the display surface, the user can thus readily resize the image or virtual object simply by thus moving either or both hands. Objects grasped by the user's hands can also be employed to make gestures in this manner.

Launching an Application by Gesture

The interactive display table can associate each gesture in a library of gestures with a different application facilitating the launch and execution of the application. FIGS. 9A and 9B illustrate, in an exemplary manner, the execution of an application in this manner in response to a gesture being detected that is associated with the application. In an illustration 900 shown in FIG. 9A, a finger 904a (in phantom view) is shown at the starting point of a gesture 902, is shaped like the letter "S." A finger 904b is also shown at the end point of the gesture, having just completed a movement across the display surface as represented by gesture 902. In response to gesture 902, the interactive display table looks up the gesture in a table (or other suitable memory paradigm) and determines that gesture 902 has been associated with a specific application stored in a library of gestures. In an illustration 910, which is shown in FIG. 9B, the interactive display table has executed a Solitaire application 906 that was previously associated with the gesture. Clearly, a gesture shaped like the letter "W" might be associated with Microsoft Corporation's WORD™ word processing program, so that by making that W-shaped gesture, the user can readily launch the work processing program. The gestures are not limited to letter shapes, since non-letter shaped gestures can be associated with various different applications, causing a specific application to be launched or executed on the display surface in response to the appropriate gesture being made on or proximate to the display surface.

Although most of the examples provided in the drawings are in regard to gestures made with a user's hand(s) and/or finger(s), it will be appreciated that the present invention is not limited to detecting only gestures made with an appendage of the user's body. Instead, the user can grasp an object in a hand and use it to make a gesture on the interactive display table that is detected and causes a response. For example, as shown in FIG. 9C, a personal token 922 shaped like a crayon is held in a user's hand 924 and is placed in contact with the interactive display table. The user can then draw the letter "S"

with the personal token (instead of a finger) to launch the Solitaire game. One advantage of launching the application with a gesture made with the personal token rather than with the user's finger is that the interactive display table can automatically load the user's preferences (card graphics, rules, etc.) for use in the application. For example, the personal token can have a tag on its surface with an encoded IR reflective pattern that has been pre-associated with the user's profile, including the preferences for the application that will be launched in response to the gesture made with the personal token.

Recognizing gestures can also be used for personalization. If the interactive display table were in a generic shell state, a user might make a unique gesture on the table to cause the user's personalized shell to appear. More complex gestures can be used to limit access to applications, such as personal money management software, by serving much like a password that has to be entered to enable the application to be executed or to permit specific personal data to be accessed.

Creating Virtual Objects by Gesture

The interactive display table can associate a library of gestures virtual objects, so that a specific virtual object will be presented on the display surface in response to a corresponding gesture being detected. FIGS. 10A and 10B illustrate, in an exemplary manner, the accessing and presentation of a virtual object in response to a corresponding gesture. In FIG. 10A, an illustration 1000 shows a finger 1002a at the starting point of a first gesture portion 1004a (also the end point of a second gesture portion 1004b). A phantom finger 1002b is shown at an intermediate position for the gesture, i.e., at the end point of first gesture portion 1004a (and the starting point of second gesture portion 1004b). Having sensed the gesture, which in this example is generally shaped like a banana, the interactive display table determines that the gesture is associated with a virtual object stored in a library of gestures. In FIG. 10B, an illustration 1010 shows the interactive display table has presented a virtual object 1006, which is an image of a banana that is associated with the gesture.

While not shown in the drawings, it will be appreciated that using a green game piece (instead of a finger) to draw a banana shape might create a green banana, while using a red game piece might create a red banana. This method can thus be used for distinguishing players using the interactive display table. Since the IR video camera of the preferred embodiment shown in FIG. 2 can't sense color, the game pieces would have tags that are pre-associated with their respective colors, and thus would be usable for identifying the user making a gesture with the game piece, as well as causing a virtual object corresponding to the color of the game piece to be displayed on the interactive display table. It is also contemplated that the vision sensing system included in the interactive display table might include a full color sensing camera that would be capable of responding to the color of light reflected by objects adjacent to the interactive display surface.

Attributes of the gesture can also be taken into account when the virtual object is presented on display surface 64a. For example, making larger gestures in illustration 1000 can cause a larger image of a banana to be presented on the display surface. As a further example, if drawing the shape of a wave (i.e., a series of connected scallop shapes) is associated with a virtual image or object representing a body of water in appearance, the size of the body of water can be inferred by the number of waves (scallops) included in the gesture, or the height of waves presented on in the virtual image of the body of water can be inferred by the depth of the scallops comprising the gesture made by the user on the display surface.

Controlling Video Playback by Gesture

FIGS. 11A-11F illustrate, in an exemplary manner, how gestures can be employed for controlling a video playback, within the context of a video play application that is executing on the interactive display table. Illustrations 1100, 1110, 1120, 1130, 1140, and 1150, which are respectively shown in FIGS. 11A, 11B, 11C, 11D, 11E, and 11F, show a video image (i.e., a moving stick FIG. 1106) displayed on display surface 64a. Based upon the touch connected components sensed in the images produced by the IR video camera disposed under the display surface, the interactive display table infers a finger 1102 and a hand 1104 and detects various gestures made by the user moving the hand and finger for controlling the video playback presented on the display surface.

In FIG. 11A, illustration 1100 shows that the interactive display table senses a finger 1102a coupled to a hand 1104b, as the tip of the finger touches the display surface and recognizes the gesture as a command to pause a video playback on display surface 64a, if the video is currently playing, or alternatively, to play the video, if the video was already paused. Touching the display surface to play or pause playback can occur at any place on the display surface.

In FIG. 11B, illustration 1110 shows that the interactive display table senses the tip of the finger and hand sliding toward the left on the display surface and recognizes the sliding gesture as a command to rewind the video. In illustration 1120 of FIG. 11C, the interactive display table senses when the finger and hand slides still farther toward the left on the display surface and recognizes this sliding gesture as a command to rewind video at a faster rate. Thus, the interactive display table recognizes the distance a finger and hand has moved left or right from the touch point as a rate variable controlling aspect of this gesture and responds accordingly.

Illustration 1130 of FIG. 11D shows that the interactive display table senses when the finger and hand slides toward the right on the display surface and recognizes the sliding gesture as a command to fast forward the video. Although not illustrated, the interactive display table also recognizes that sliding the finger farther to the right as a gesture is a command to increase the rate for fast forwarding of the video.

In FIG. 11E, illustration 1140 indicates that the interactive display table senses when the finger and hand slides toward the top of the interactive display table—i.e., away from the user—and recognizes this gesture as a command to zoom in within the video. However, it will be understood that sliding the finger toward the top of the interactive display table could be defined as a different function, such as raising the video volume. Again, although not shown, an amount of the zoom that is applied can be based upon the extent of the upward movement in this gesture.

Illustration 1150 in FIG. 11F shows that the interactive display table senses when the user's finger and hand slides toward the bottom of the interactive display table—i.e., toward the user—and recognizes this gesture as a command to zoom out within the video. Again, sliding the finger toward the bottom of the interactive display table could be defined as another function, such as lowering the video volume. The extent of the movement of the hand and finger downwardly will normally control the extent of the changes made.

Process for Gesture Recognition

A gesture can comprise a single point on the interactive display table that corresponds to a location, for example, where a user is touching the display surface with a finger tip, or can comprise a more complex set of contacts and hovering objects, for example, including one or more fingers on each hand in contact with the display surface. Moreover, gestures often involve movement of one or both hands over or with one or more fingers in contact with the display surface. Accordingly, the interactive display table executes an algorithm to determine which (if any) of the objects detected in the image produced by the IR video camera corresponds to a user's finger on (as well as the hand above) the display surface, where a moving finger/hand is likely to appear; and if the path traced by the finger/hand matches a stored path. The algorithm executed on the interactive display table also determines if a hand pose matches a stored pose or if a combination of a hand pose and path of movement matches a stored pose/path.

FIG. 12 illustrates, in an exemplary manner, the logical steps implemented for handling gesture recognition. As indicated in a flow chart 1200, in a step 1202, an Image Processing Module (IPM) filters and analyzes the input image for each connected component on the table to determine whether it is a finger/hand touching or hovering over the display surface to provide a gesture input. This step filters out distracter objects—objects that may appear and disappear rapidly over several frames of images produced by the IR video camera. The algorithm determines whether a given connected component identified in the image represents a point of contact or a hovering object as a function of how many connected components having an intensity over a predefined threshold level are grouped together, how far away each of the other connected components are from any touch or hover connected component, and how stable the connected component is over time. The behavior of the algorithm is such that if there are no distracter connected components in the neighborhood of a given touch connected component, for example, it will be judged as a possible point of contact of a finger tip relatively quickly, while if there are several distracters appearing and disappearing around the touch connected component, there will be several frames of delay until the algorithm judges the touch connected component is stable (and so valid) as a point of contact of a finger. This technique provides a satisfactory tradeoff between robustness and responsiveness.

The process continues at a step 1204, wherein an object prediction module predicts the next location of a moving object, such as the user's finger/hand, to detect gestures that include movement. The object prediction module searches for possible re-appearance of the object in a location predicted by a motion model, which examines the last several observations of the object collected before the object disappeared. For example, using a linear motion model, the predicted position is a function of the velocity of the object before it disappeared and how long it has been since the object disappeared. The purpose for employing the object prediction module when performing tracking and detecting the corresponding movement of the object is to enable the path of the object to be accurately reconstructed when identifying a gesture. Linear prediction methods can be applied to assist in achieving this goal.

Gestures that include movement are modeled as a time-series relating the position of a single contact point corresponding to the user's finger tip as it moves across the display surface along a path. The process continues at an optional step 1208, wherein a path recognition module matches the movement history of each of the objects determined to be valid contact points by the above object filtering and persistence steps, to determine if the movement history is consistent with the path. When the movement sufficiently matches the motion model, so that a gesture is identified, the gesture recognition process notifies an application executing on the interacting display table that the user has performed the gesture that was identified on the display surface, and the application may respond appropriately. Several gesture models may be considered simultaneously. Each gesture model includes a prototype path that is collected during design time with a gesture recording application that enables such paths to be recorded, saved, and viewed. Subsequently, another application may then request that such gesture models be loaded, to enable the gestures to be detected, so that the application can respond to the gesture in a predefined manner. An application that requires the recognition of a set of gestures may request the sensing system to load multiple gesture models, and a corresponding library of gestures, and will receive notifications for each, if detected.

The process continues at an optional step 1208, wherein a static shape or pose of the hand is considered a gesture. For example, the user may form their hand on the table in various shapes to convey various symbols or quantities, or carry out any predefined function or action corresponding to the recognized pose or static gesture. An application interested in detecting when the user performs such static gestures may use the generalized bitmap recognition system in connection with predefined templates to recognize shapes of objects, which was developed for the interactive display table and is described in detail in commonly assigned, co-pending patent application Ser. No. 10/813,855, entitled "Template Matching on Interactive Surface," filed on Mar. 31, 2004, the specification and drawings of which are hereby specifically incorporated herein by reference.

The process continues at an optional step 1210, wherein both a path and a hand pose are recognized (if the hand is moving). A more generalized definition of "gesture" includes both the path of the hand on the table as well as a changing pose of the hand as it moves along the path. An example of this type of movement is a "sweeping" gesture along path that arcs away from the user, with the hand in a flat, outstretched pose of a specific orientation. The pose recognition process can be combined with the path recognition process by combining a match score returned from the generalized image recognition process, with a match score returned from the path recognition process. To emphasize either the pose or the path over the other, the match scores may be weighted differently in a linear combination. The simplest case to consider is one in which there is only one pose model throughout the entire length of the gesture.

More complex gestures may include a pose that changes over time or during the movement along the path. In such cases, a gesture model is applied that takes into consideration the pose that is in effect at each point in time, and a pose match score that varies over time. The generalized image recognition system can recognize a plurality of poses simultaneously, which in combination, form a gesture. The calculation of a total match score may be accomplished by using a matching algorithm that is similar to the path matching algorithm. In addition to the position coordinates, each point in the path with information about the pose at that point in time can be determined to detect a more complex gesture. When computing the match between a given point in a prototype and the corresponding point in the input, it may be desirable to weight the two points differentially to provide more emphasis on one or the other.

Process for Defining and Associating Gestures

To facilitate recognition, gestures are predefined and are preferably associated with applications, or functions, actions, and/or objects within applications. FIG. 13 includes a flow chart 1300 that illustrates, in an exemplary manner, the steps for defining and associating gestures in this manner. As indicated in a step 1302, an application developer performs a gesture to be defined and associated with some aspect of the application (or with launching the application). In a step 1304, the shape of the gesture, which includes a static pose, or varying pose, as well as the path, is entered into a gesture database (or library) for future comparison against gestures made by a user of the interactive display table.

In an optional step 1306, the gesture is associated with an application to facilitate launching the application, or with a function in the application that will be carried out when the gesture is subsequently made by a user and recognized. Alternatively, in an optional step 1308, the gesture is associated with a virtual object (or with some other aspect) in an application so that the virtual object is presented on the display surface (or the aspect is implemented) when the gesture is subsequently made by a user and recognized.

Process for Launching Application

FIG. 14 illustrates a flow chart 1400 that shows, in an exemplary manner, the logical steps of a process for launching an application in response to a gesture. A step 1402 executes or runs a gesture recognizer. In a step 1404, a user makes (or draws) a gesture on the display surface using a finger (see FIG. 9A). In a decision step 1406, the gesture recognizer determines if the gesture matches one stored in the gesture database. If so, the process continues at a step 1408 and the application associated with the gesture is launched, otherwise the gesture is ignored, as noted in a step 1410.

Process for Drawing Virtual Object

FIG. 15 illustrates, in an exemplary manner, a process for drawing a virtual object associated with an application by gesture. In a flow chart 1500, a step 1502 executes an application and a gesture recognizer. In a step 1504, a user draws a gesture on the interactive display table (see FIG. 10). In a decision step 1506, the gesture recognizer determines if the gesture matches one stored in the gesture database. Note that matching the gesture could depend on a number of factors including the location of the gesture on the display surface, when the gesture is made, the size of the gesture, the speed of the gesture, the orientation of the gesture, the stroke order of the gesture, or the direction of the gesture. If the gesture matches a gesture stored in the gesture database, the process continues at a step 1508 and the virtual object associated with the application is rendered on the in interactive display table, otherwise the gesture is ignored as show in a step 1510.

Process for Controlling Video Playback

FIG. 16 illustrates a flow chart 1600 that includes the steps for controlling video playback, in an exemplary manner. (See FIGS. 11A-11F.) A step 1602 senses an input gesture. In a step 1604, the module determines the context of the application currently being executed by the interactive display table. Determining the type of application that is currently executing—in this case video playback—ensures that the proper set of gestures applicable to that application are loaded and accessed to determine the correct function to carry out in response to a gesture made by a user. It is possible that the same gestures might be used to cause different functions to be carried out when different applications are being executed at the time the user makes the gesture. Also, the state of the application being executed can have an effect on the function that is carried out. For example, in the application that plays a video, the user toggles between play and pause using the same gesture.

In a step 1606, the logic determines any motion and direction of a user finger/hand relative to display surface 64*a*. In a step 1608, the logic matches the gesture to the context database or library of gestures for the application that is running. A decision step 1610 determines if the gesture includes any movement. If not, then the process continues at a step 1612 wherein the application executes the corresponding function. For example, in the play video option, the function toggles between play and pausing video playback in response to the user touching the display surface anywhere with a finger.

If the gesture includes movement of one or more fingers/hands, the process continues at a decision step 1614, wherein the logic determines if the motion is to the left or right. If the motion is to the right or left, the process continues at a step 1616, wherein the logic determines the position rate of change. The extent of movement of a finger/hand determines the rate at which the corresponding function is to be carried out, as indicated in a step 1618. In the video play application, the function responds to this gesture by implementing a rewind/fast forward at a speed determined by the extent of the movement in the gesture. It will be appreciated that the position rate of change need not be considered for some functions that respond to a movement to the left or right in the gesture.

If the motion is not to the right or left, but is instead, in another direction such as up or down, the process continues at a step 1620, wherein the logic executes another predefined function corresponding to the direction of the motion detected in the gesture, such as zooming in or out, or changing volume level. Again, the extent of the movement during the gesture can determine the degree to which the function is applied, or the function may not be of a type that is variable in response to the extent of movement detected during the gesture.

The functionality carried out in response to gestures for use in controlling video playback can instead be applied to other applications where a scrolling or variable rate or degree control is desirable, such as animation, audio, web browsing, etc. Also, the gestures associated with functions used in controlling applications or objects or actions in applications is clearly not limited to a point contact or movement of a finger/hand left/right, or up/down on the display surface. Many other gestures involving simple and complex poses and movement can employed for this purpose. It was not the intent to define all possible gestures that might be employed, but simply to provide some clear examples to illustrate the use of gestures. Also, gestures can be made with a user's arm or other appendage and are not limited only to fingers/hands. It should also be understood that a gesture can correspond only to hover connected components, so that the user need not touch the display surface to make a gesture, but instead, can simply move a hand or arm over and proximate to the display surface to produce a gesture.

Several other features of the present invention will be apparent from reviewing FIGS. 4A-7B. In particular, FIGS. 6A, 6C, and 6E illustrate changes in the connected components that are determined by processing the signal from the video camera that is produced in response to the IR light reflected from hover components and touch components as the set of connected components corresponding to the user's arm, hand, and finger move over the display surface from a specific side or location around the interactive display table. In the example shown in these Figures, the user is disposed on the left side of the display surface and is reaching over the display surface with a left arm, sliding the thumb and forefinger in contact with the display surface. It will be apparent that the interactive display table can readily deduce that touch connected components 604*a*, 604*b*, and 604*c* shown in FIGS. 6A, 6C, and 6E correspond to fingers belonging to a hand of that specific user, based upon the temporal pattern of the connected components, as well as the orientation of the connected components. As used herein and in the claims that follow, the term "temporal pattern" is intended to refer to the successive changes in connected components corresponding to a hover object and/or a touch object, over time, as the object(s) move relative to the display surface. The temporal pattern thus provides an indication of a direction of movement of the connected components and corresponding objects, relative to the location around the display surface from which the objects are moving. The temporal pattern is very useful when the objects are the appendage (arm, hand, and/or fingers) of a user, since the temporal pattern can be used to determine the location and thus, the identity of the user making a gesture. Similarly, for each other user of the interactive display table, the same logic can be applied to determine when a specific user is making a gesture with a hand and/or fingers, based upon an analysis of the temporal pattern and orientation of the connected components corresponding to that user's appendage (i.e., that user's arm, hand, and/or fingers). The interactive display table will also likely have data indicating a location of each specific user around the display surface, so that the user making a gesture is readily identified by analyzing the orientation and temporal pattern of the connected components corresponding to that user's appendage.

Also, the specific details of an application being executed by the interactive display table will be useful in helping to identify both the gestures made by a user, based upon the probability of such gestures being made, in regard to a current known state of the application, and the identity of the user making the gesture. For example, it is likely that a specific gesture may have been made by a user whose turn it is to provide an input to the interactive display table, and based upon the likelihood of the expected input being provided, the gesture can readily be recognized.

Although the present invention has been described in connection with the preferred form of practicing it, those of ordinary skill in the art will understand that many other modifications can be made to the invention within the scope of the claims that follow. Accordingly, it is not intended that the scope of the invention in any way be limited by the above description, but instead be determined entirely by reference to the claims that follow.

The invention in which an exclusive right is claimed is defined by the following:

1. A method for using a gesture in connection with an interactive display system on which images are displayed and objects disposed on or proximate thereto are optically detectable, comprising the steps of:
   (a) forming an image with light reflected from an object that is disposed above a display surface of the interactive display system, the light that is thus reflected being detected after passing through the display surface;
   (b) processing the image to distinguish between touch objects physically touching the display surface and hover objects proximate to the display surface and to recognize a gesture that was made by the user using the object, said gesture being recognized in response to detecting at least one connected component within the image, said connected component comprising adjacent pixels having an intensity within a predefined threshold; and
   (c) as a function of the gesture that was recognized, automatically producing a response that has previously been associated with the gesture, said response changing a state of the interactive display system.

2. The method of claim 1, wherein the object comprises at least a portion of an appendage of a user's body.

3. The method of claim 1, wherein the step of identifying the shape comprises the step of comparing the shape to a predefined template.

4. The method of claim 1, wherein the object is manipulated by a user grasping the object in the user's hand.

5. The method of claim 1, wherein the gesture includes a movement of the object along a generally defined path.

6. The method of claim 2, wherein the gesture comprises a pose of the at least the portion of the appendage adjacent to the display surface, wherein the at least a portion the appendage results in a touch object and a hover object.

7. The method of claim 1, wherein the at least one connected component includes at least one touch connected component corresponding to a contact of the display surface by the object and at least one hover connected component.

8. The method of claim 2, wherein the at least one connected component corresponds to at least one finger as a touch connected component and a hand of the user acting as a hover connected component.

9. The method of claim 1, wherein the response that is automatically produced comprises the step of executing a software application associated with the gesture, on the interactive display system.

10. The method of claim 9, wherein the gesture defines an alpha character that relates to the software application.

11. The method of claim 1, wherein the response that is automatically produced comprises the step of executing a function within an application that is being executed by the interactive display system.

12. The method of claim 11, wherein the response further comprises the step of enabling a user to move the object to indicate an extent by which a variable relating to the function is changed when the function is executed.

13. The method of claim 1, wherein the response that is automatically produced comprises the step of selecting a region defined by the gesture on the display surface of the interactive display system.

14. The method of claim 1, wherein the response that is automatically produced comprises the step of selecting one of an image and a virtual object that is presented on the display surface.

15. The method of claim 14, wherein the response further comprises the step of enabling a user to resize the one of the image and the virtual object by moving the object over the display surface.

16. The method of claim 1, wherein the response comprises the step of presenting a virtual object on the display surface, the virtual object being associated with the gesture.

17. The method of claim 2, wherein the step of detecting at least one connected component comprises the step of detecting a plurality of touch connected components and at least one hover connected component to generally determine an orientation of the appendage of the user, so as to enable the gesture to be correctly recognized.

18. The method of claim 17, wherein the plurality of touch connected components corresponds to fingers of the user that are in contact with the display surface, and wherein the at least one hover connected component corresponds to a hand of the user that is proximate to the display surface.

19. The method of claim 17, wherein the plurality of touch connected components are used to identify multiple fingers that are in contact with the display surface, and to determine that the multiple fingers belong to one hand of a user.

20. The method of claim 17, further comprising the steps of:
  (a) analyzing temporal patterns of the plurality of touch connected components as the touch connected components change over time;
  (b) identifying groupings of multiple fingers that are in contact with the display surface; and
  (c) determining that the multiple fingers are coupled to a hand of a specific user, based upon the orientation of the connected components and their temporal patterns.

21. The method of claim 17, further comprising the steps of:
  (a) analyzing temporal patterns of a plurality of sets of touch connected components as the touch connected components change over time;
  (b) identifying appendages of each of a plurality of different users, where the appendages are hovering adjacent to the display surface; and
  (c) determining that groupings of multiple fingers in contact with the display surface belong to specific ones of the appendages, and thus, belong to specific users, based on an orientation of each appendage, and on the temporal patterns.

22. The method of claim 21, wherein the step of determining comprises the step of determining that an appendage and a grouping of multiple fingers belongs to a specific user based upon knowledge of where the specific user is located around the display surface.

23. A computer readable storage medium storing machine instructions for performing a method for using a gesture in connection with an interactive display system on which images are displayed and objects disposed on or proximate thereto are optically detectable, the method comprising:
  (a) processing an image to distinguish between touch objects physically touching a display surface and hover objects proximate to the display surface and to recognize a gesture that was made by the a user using the object, said gesture being recognized in response to detecting a plurality of touch connected components and at least one hover connected component to generally determine an orientation of an appendage of the user, said connected components comprising adjacent pixels having an intensity above a predefined threshold; and
  (b) as a function of the gesture that was recognized, automatically producing a response that has previously been associated with the gesture, said response changing a state of the interactive display system;
  (c) analyzing temporal patterns of a plurality of sets of touch connected components as the touch connected components change over time;
  (d) identifying appendages of each of a plurality of different users, where the appendages are hovering adjacent to the display surface; and
  (e) determining that groupings of multiple fingers in contact with the display surface belong to specific ones of the appendages, and thus, belong to specific users, based on an orientation of each appendage, and on the temporal patterns.

24. An interactive display system that responds to a gesture made with an object, comprising:
  (a) a display surface having an interactive side on or adjacent to which an object can be placed and manipulated, and an opposite side;
  (b) a light source that directs light toward the opposite side of the display surface and through the display surface, to the interactive side;
  (c) a light sensor disposed to receive and sense light reflected back from an object through the display surface, producing a signal corresponding to an image of an object that is in contact or proximate to the display surface;
  (d) a processor in communication with the light sensor; and
  (e) a memory in communication with the processor, the memory storing data and machine instructions that cause the processor to carry out a plurality of functions, including:
    (i) processing the image to distinguish between touch objects physically touching the display surface and hover objects proximate to the display surface and to recognize a gesture that was made by the user using the object, said gesture being recognized in response to detecting at least one connected component within the image, said connected component comprising adjacent pixels having an intensity above a predefined threshold; and
    (ii) as a function of the gesture that was recognized, automatically producing a response that has previously been associated with the gesture in the memory, said response changing a state of the interactive display system.

25. The interactive display system of claim 24, wherein the object comprises at least a portion of an appendage of a user.

26. The interactive display system of claim 24, wherein the shape is identified by comparing the shape to a predefined template.

27. The interactive display system of claim 24, wherein the object is grasped in a hand of a user.

28. The interactive display system of claim 24, wherein the gesture includes a movement of the object along a generally defined path.

29. The interactive display system of claim 25, wherein the gesture comprises a pose of at least the portion of an appendage adjacent to the display surfaced, wherein the at least a portion the appendage results in a touch object and a hover object.

30. The interactive display system of claim 24, wherein the at least one connected component includes at least one touch connected component corresponding to a contact of the display surface by the object and at least one hover connected component.

31. The interactive display system of claim 25, wherein the at least one connected component corresponds to at least one finger as a touch connected component and a hand of a user acting as a hover connected component.

32. The interactive display system of claim 24, wherein the response that is automatically produced is executing a software application associated with the gesture, using the processor.

33. The interactive display system of claim 32, wherein the gesture defines an alpha character that relates to the software application.

34. The interactive display system of claim 24, wherein the response that is automatically produced comprises executing a function within a software application that is being executed by the processor.

35. The interactive display system of claim 34, wherein the response further comprises enabling a user to move the object to indicate an extent by which a variable relating to the function is changed when the function is executed by the processor.

36. The interactive display system of claim 24, wherein the response that is automatically produced comprises selecting a region defined by the gesture on the display surface.

37. The interactive display system of claim 24, wherein the response that is automatically produced comprises selecting one of an image and a virtual object that is presented display surface, as determined by the gesture.

38. The interactive display system of claim 37, wherein the response further comprises enabling a user to resize the one of the image and the virtual object by moving the object over the display surface.

39. The interactive display system of claim 24, wherein the response comprises presenting a virtual object on the display surface, the virtual object being associated with the gesture.

40. The interactive display system of claim 25, wherein the machine instructions cause the processor to detect a plurality of touch connected components and at least one hover connected component to generally determine an orientation of an appendage of a user, so as to enable the gesture to be correctly recognized.

41. The interactive display system of claim 40, wherein the plurality of touch connected components corresponds to fingers of a user that are in contact with the display surface, and wherein the at least one hover connected component corresponds to a hand of a user that is proximate to the display surface.

42. The interactive display system of claim 40, wherein the plurality of touch connected components are used to identify multiple fingers that are in contact with the display surface, and to determine that the multiple fingers belong to one hand of a user.

43. The interactive display system of claim 40, wherein the machine instructions further cause the processor to analyze temporal patterns of the plurality of touch connected components as the touch connected components change over time, to identify groupings of multiple fingers that are in contact with the display surface, and to determine that the multiple fingers are coupled to a hand of a specific user, based upon the orientation of the connected components and their temporal patterns.

44. The interactive display system of claim 40, wherein the machine instructions further cause the processor to analyze temporal patterns of a plurality of sets of touch connected components as the touch connected components change over time, to identify appendages of each of a plurality of different users, where the appendages are hovering adjacent to the display surface, and to determine that groupings of multiple fingers in contact with the display surface belong to specific ones of the appendages, and thus, belong to specific users, based on an orientation of each appendage, and on the temporal patterns.

45. The interactive display system of claim 44, wherein the machine instructions further cause the processor to determine that an appendage and a grouping of multiple fingers belongs to a specific user based upon knowledge of where the specific user is located around the display surface.

46. The interactive display system of claim 24, wherein the light source produces infrared light and the light sensor senses infrared light that is reflected from object.

* * * * *